(12) United States Patent
Bice et al.

(10) Patent No.: US 8,364,800 B2
(45) Date of Patent: Jan. 29, 2013

(54) AUTOMATED MESSAGE HANDLING SYSTEM AND PROCESS

(75) Inventors: Richard S. Bice, Severna Park, MD (US); Jon P. Brusseau, Clinton Township, MI (US); Richard L. Lacourse, Laurel, MD (US); Herbert T. Raffaele, Springfield, VA (US)

(73) Assignee: Verizon Business Network Services Inc., Basking Ridge, NJ (US)

( * ) Notice: Subject to any disclaimer, the term of this patent is extended or adjusted under 35 U.S.C. 154(b) by 189 days.

(21) Appl. No.: 12/025,609

(22) Filed: Feb. 4, 2008

(65) Prior Publication Data
US 2008/0189376 A1 Aug. 7, 2008

Related U.S. Application Data

(63) Continuation of application No. 09/879,816, filed on Jun. 12, 2001, now abandoned.

(51) Int. Cl.
*G06F 15/173* (2006.01)
(52) U.S. Cl. ........................................ 709/223
(58) Field of Classification Search ........... 709/223–226
See application file for complete search history.

(56) References Cited

U.S. PATENT DOCUMENTS

| | | | |
|---|---|---|---|
| 5,283,856 A | 2/1994 | Gross et al. | |
| 5,627,997 A | 5/1997 | Pearson et al. | |
| 5,802,253 A | 9/1998 | Gross et al. | |
| 5,926,100 A | 7/1999 | Escolar | |
| 6,092,102 A * | 7/2000 | Wagner | 340/7.29 |
| 6,125,391 A | 9/2000 | Meltzer et al. | |
| 6,182,118 B1 | 1/2001 | Finney et al. | |
| 6,347,307 B1 * | 2/2002 | Sandhu et al. | 705/36 R |
| 6,493,696 B1 | 12/2002 | Chazin | |
| 6,513,129 B1 * | 1/2003 | Tentij et al. | 714/4 |
| 6,560,611 B1 | 5/2003 | Nine et al. | |
| 6,563,800 B1 | 5/2003 | Salo et al. | |
| 6,564,264 B1 | 5/2003 | Creswell et al. | |
| 6,591,260 B1 | 7/2003 | Schwarzhoff et al. | |
| 6,631,363 B1 * | 10/2003 | Brown et al. | 707/1 |
| 6,701,378 B1 * | 3/2004 | Gilhuly et al. | 709/249 |
| 6,704,874 B1 * | 3/2004 | Porras et al. | 726/22 |
| 6,714,977 B1 * | 3/2004 | Fowler et al. | 709/224 |
| 6,742,054 B1 | 5/2004 | Upton, IV | |
| 6,748,555 B1 | 6/2004 | Teegan et al. | |
| 6,753,889 B1 | 6/2004 | Najmi | |
| 6,772,180 B1 | 8/2004 | Li et al. | |
| 6,789,077 B1 | 9/2004 | Slaughter et al. | |

(Continued)

FOREIGN PATENT DOCUMENTS
WO WO-00/74193 12/2000

OTHER PUBLICATIONS

Muller, Focus on OpenView 1995.*

*Primary Examiner* — Benjamin R Bruckart
*Assistant Examiner* — Scott M Sciacca

(57) ABSTRACT

The present invention relates to a system and process for resolving messages from application components to back-end systems. The system comprises a standardized message definition which uses a tagged field format through which application components communicate to a message handler. The message handler applies rules that define actions to be taken and recipients of information based on the contents of the message. The rules may be pre-defined by a customer associated with an application component generating a message, based on common rules applied to components generally, or based upon service rules associated with the service provider, such as level of service subscriptions or other characteristics, or based on a combination of any or all of the above bases. By utilizing published message formats, the present invention provides a platform independent framework for exposing application hosting back-end systems to customer applications.

20 Claims, 20 Drawing Sheets

U.S. PATENT DOCUMENTS

| | | |
|---|---|---|
| 6,795,778 B2 * | 9/2004 | Dodge et al. .................... 702/34 |
| 6,816,865 B2 * | 11/2004 | O'Brien et al. ................ 707/100 |
| 6,826,597 B1 | 11/2004 | Lonnroth et al. |
| 6,832,341 B1 * | 12/2004 | Vijayan ........................ 709/224 |
| 6,918,084 B1 * | 7/2005 | Slaughter et al. ............. 715/205 |
| 6,920,502 B2 | 7/2005 | Araujo et al. |
| 6,971,096 B1 * | 11/2005 | Ankireddipally et al. .... 718/101 |
| 7,072,934 B2 | 7/2006 | Helgeson et al. |
| 7,072,985 B1 | 7/2006 | Lev-Ami et al. |
| 7,093,005 B2 * | 8/2006 | Patterson ...................... 709/220 |
| 7,162,534 B2 * | 1/2007 | Schleiss et al. ............... 709/232 |
| 7,188,158 B1 | 3/2007 | Stanton et al. |
| 7,200,684 B1 * | 4/2007 | Schales et al. ................ 709/252 |
| 7,224,979 B2 * | 5/2007 | Singhal et al. ............. 455/456.1 |
| 7,243,130 B2 * | 7/2007 | Horvitz et al. ................ 709/207 |
| 7,249,159 B1 * | 7/2007 | Horvitz et al. ................ 709/206 |
| 7,269,625 B1 * | 9/2007 | Willhide et al. .............. 709/206 |
| 7,313,608 B1 * | 12/2007 | Swedor et al. ................ 709/221 |
| 2001/0037404 A1 | 11/2001 | Hafsteinsson et al. |
| 2001/0051890 A1 * | 12/2001 | Burgess ............................ 705/9 |
| 2002/0019584 A1 * | 2/2002 | Schulze et al. ................ 600/300 |
| 2002/0035584 A1 * | 3/2002 | Scheier et al. ................ 707/517 |
| 2002/0059566 A1 | 5/2002 | Delcambre et al. |
| 2002/0091539 A1 * | 7/2002 | Yin et al. .......................... 705/1 |
| 2002/0111876 A1 | 8/2002 | Rudraraju et al. |
| 2002/0169825 A1 * | 11/2002 | Hougland et al. ............ 709/203 |
| 2002/0198667 A1 * | 12/2002 | Dodge et al. .................... 702/34 |
| 2002/0198931 A1 * | 12/2002 | Murren et al. ................. 709/203 |
| 2003/0009543 A1 * | 1/2003 | Gupta ............................ 709/223 |
| 2003/0028447 A1 | 2/2003 | O'Brien et al. |
| 2003/0069848 A1 | 4/2003 | Larson et al. |
| 2003/0144746 A1 * | 7/2003 | Hsiung et al. ................... 700/28 |
| 2003/0167456 A1 | 9/2003 | Sabharwal |
| 2003/0182395 A1 | 9/2003 | Lynch et al. |
| 2006/0015565 A1 | 1/2006 | Nainani et al. |
| 2006/0095530 A1 | 5/2006 | Daniell et al. |

* cited by examiner

```xml
<?xml version="1.0" ?>
<Schema name="CaseMgmtReq" b:BizTalkServerEditorTool_Version="1.0" b:root_reference="CaseMgmtReq" b:standard="XML"
    xmlns="urn:schemas-microsoft-com:xml-data" xmlns:b="urn:schemas-microsoft-com:BizTalkServer" xmlns:d="urn:schemas-
    microsoft-com:datatypes">
    <b:SelectionFields>
        <b:Field key="Document_Node" query="." />
        <b:Field key="Dest_ID_Value" query="/@DestinationAddress" />
    </b:SelectionFields>
    <ElementType name="Request" content="eltOnly" model="closed" >
        <b:RecordInfo />
        </elementype="ApplicationError" maxOccurs="1" minOccurs="0" />
    </ElementType>
    <ElementType name="Error" content="empty" model="closed">
        <b:RecordInfo tag_name="Error" />
        <AttributeType name="ErrorNumberType" d:type="string">
            <description>Origin of the number ( i.e. Win32, NativeSQL, TCP, etc )</description>
            <b:FieldInfo />
        </AttributeType>
        <AttributeType name="ErrorNumber" d:type="string">
            <b:FieldInfo />
        </AttributeType>
        <AttributeType name="ErrorDescription" d:type="string">
            <b:FieldInfo />
        </AttributeType>
        <attribute type="ErrorNumberType" required="no" />
        <attribute type="ErrorNumber" required="no" />
        <attribute type="ErrorDescription" required="no" />
    </ElementType>
    <ElementType name="CaseMgmtReq" content="eltOnly" model="closed">
        <b:RecordInfo />
        <AttributeType name="UserID">
            <b:FieldInfo />
        </AttributeType>
        <AttributeType name="Type">
            <b:FieldInfo />
        </AttrubuteType>
        <AttributeType name="SiteID">
```

```
<b:FieldInfo/>
</AttributeType>
= <AttributeType name="Severity">
    <b:FieldInfo />
  </AttributeType>
= <AttributeType name="RequestType">
    <b:fieldInfo/>
  </AttributeType>
= <AttributeType name="RequestID">
    <b:FieldInfo />
  </AttributeType>
= <AttributeType name="OrgID">
    <b:FieldInfo />
  </AttributeType>
= <AttributeType name="DestinationAddress">
    <b:FieldInfo />
  </AttributeType>
= <AttributeType name="Action">
    <b:FieldInfo />
  </AttributeType>
  <attribute type="RequestID" />
  <attribute type="SiteID" />
  <attribute type="OrgID" required="no" />
  <attribute type="Severity" />
  <attribute type="RequestType" required="no" />
  <attribute type="Type" required="no" />
  <attribute type="Action" required="no" />
  <attribute type="UserID" required="no" />
  <attribute type="DestinationAddress" required="no" />
  <element type="Abstract" maxOccurs="1" minOccurs="0" />
  <element type="CaseInitiator" maxOccurs="*" minOccurs="0" />
  <element type="Request" maxOccurs="*" minOccurs="0" />
</ElementType>
= <ElementType name="CaseInitiator" content="textOnly" model="closed">
    <b:RecordInfo />
  </AttributeType>
= <AttributeType name="Password">
    <b:FieldInfo />
  </AttributeType>
```

FIG. 2C

```
= <AttributeType name="KeyName">
    <b:FieldInfo />
  </AttributeType>
  <attribute type="KeyName" />
  <attribute type="Password" />
  </ElementType>
= <ElementType name="ApplicationError" content="eltOnly" model="closed">
    <b:RecordInfo />
= <AttributeType name="UserPhone" d:type="string">
    <b:FieldInfo />
  </AttributeType>
= <AttributeType name="UserEmail" d:type="string">
    <b:FieldInfo />
  </AttributeType>
= <AttributeType name="User" d:type="string">
    <b:FieldInfo />
  </AttributeType>
= <AttributeType name="ServerName" d:type="string">
    <description>Network identification full computer name</description>
    <b:FieldInfo />
  </AttributeType>
= <AttributeType name="Procedure" d:type="string">
    <description>If error occurred in an identifiable procedure, the name of that procedure</description>
    <b:FieldInfo />
  </AttributeType>
= <AttributeType name="ProblemType" d:type="enumeration" d:values="File Database OS Security Resource Other">
    <description>Categorize the error</description>
    <b:FieldInfo />
  </AttributeType>
= <AttributeType name="Page" d:type ="string">
    <description>For Web sites, the file containing the code that errored. If it is an include file, it should reference the page it is included into; i.e. "Display.inc included into ./Member/Customer.asp"</description>
    <b:FieldInfo />
  <AttributeType>
```

FIG. 2D

```
= <AttributeType name="LineNumber" d:type="string">
    <description>If available, the line number or label where the error occurred</description>
    <b:FieldInfo />
  </AttributeType>
= <AttributeType name="IPAddress" d:type="string">
    <description>Digex Internal IP address</description>
    <b:FieldInfo />
  </AttributeType>
= <AttributeType name="DateTime" d:type="dateTime.tz">
    <b:FieldInfo/>
  </AttributeType>
= <AttributeType name="Application" d:type="string">
    <description>Name of the application generating this document</description>
    <b:FieldInfo />
  </AttributeType>
  <attribute type="DateTime" required="yes" />
  <attribute type="ServerName" required="no" />
  <attribute type="IPAddress" required="no" />
  <attribute type="Application" required="no" />
  <attribute type="Page" required="no" />
  <attribute type="Procedure" required="no" />
  <attribute type="LineNumber" required="no" />
  <attribute type="ProblemType" required="no" />
  <attribute type="User" required="no" />
  <attribute type="UserPhone" required="no" />
  <attribute type="UserEmail" required="no" />
  <element type="AdditionalData" maxOccurs="*" minOccurs="0" />
  <element type="Error" maxOccurs="*" minOccurs="0" />
  </ElementType>
= <ElementType name="AdditionalData" content="textOnly" model="closed">
    <b:RecordInfo tag_name="AdditionalData" />
  </ElementType>
= <ElementType name="Abstract" content="textOnly" model="closed">
    <b:RecordInfo />
  </ElementType>
  </Schema>
```

Figure 5

Customer Rules Entry Wizard

To which type of messages do you wish to apply the present rule to?

[Software Fault Measurements ▼]

To which specific component within this class do you wish the present rule to apply to?

[Truck Sales Application ▼]

Select Message Type and Enter Destination:

[E-Mail ▼]
Pager
Fax
HTTP Post

[                    ]  [ADD]

[E-Mail] john.jones@software.com
[Pager] Sam Supervisor (999-555-5555)
[HTTP] http://www.somewhere.com/support/helpdesk

[Remove]

digex ClientCentral

Logged in:
Ford
5/29/2001

| Service Administration | Case Management | Online Billing | References | User Administration | xFrame Administ: |
|---|---|---|---|---|---|
| Site Diagrams | View Log | Balance Information | Reference Manuals | Manage Users | View Log |
| Asset Management | Summary Reports | Invoice Information | FAQ | Manage Groups | App. Config. |
| Performance Statistics | Case Entry | | Acceptable Use Policy | | |
| Keynote.com | | | Terms of Use | | |
| Contact Information | | | Privacy Policy | | |
| Flash Screen | | | Contact Digex | | |
| Backup Servers | | | Help | | |
| | | | Mobile Access | | |

Digex is pleased to welcome you to ClientCentral, our newly launched online customer management tool. ClientCentral provides you with up-to-date information on your Website operations via exciting features such as online reporting and case tracking, to assist you with your strategic business decisions.

We are excited about this recent launch and are looking forward to hearing your direct feedback to ensure that future functionalities best meet your needs. Please provide any comments or suggestions to your client services representative directly or submit the online feedback form (see link at the bottom of each page). Thanks!

Digex.com  Feedback  Site Help  Log Out

Fig. 9

AUTOMATED MESSAGE HANDLING SYSTEM AND PROCESS

This patent application is a continuation application of patent application Ser. No. 09/879,816, filed Jun. 12, 2001, the disclosure of which is incorporated herein by reference.

FIELD OF THE INVENTION

The present invention pertains to the management of network hosted applications, and more particularly to the implementation of automatic data routing to allow back-end systems for managing hosted applications to function with reduced operator intervention.

BACKGROUND OF THE INVENTION

Application hosting is a growing trend in the provision of Internet applications. Host farms co-locate large numbers of servers and other application hosting components, hereinafter referred to collectively as application components, at geographically advantageous locations to provide application hosting services having efficient access to an Internet hub. The centralization of application components also provides for efficiencies in the operations of the application components, since the application components associated with different hosted applications can be managed through a single set of support, administration, and management systems and tools (hereinafter referred to collectively as "back-end systems").

The back-end systems of application hosting systems maybe built around a back-end network, which may be separate from front-end interfaces used to communicate hosted web applications to web-site visitors. A back-end network provides a communications path between the back-end systems and the application components, however the back-end network is limited to passively transmitting information from a sender to a receiver. Typically, each message sent over the back end network contains a network address to identify a recipient of the message, and data comprising the body of the message. The destination of each message is determined by the sender of the message. In order to allow a recipient of a message to understand the data contained within the message, the message must be formatted according to a protocol known to both the sending and receiving components. Additionally, the sending component must have knowledge of the existence of the intended recipient component and the necessity to send the message to the component. Accordingly, such a communications protocol is feasible where two components are required to be able to communicate, but becomes more difficult as additional components are added.

Providing a known format to both the sending and receiving components may be resolved by the use of application program interfaces, which act as translators between the components. Alternately, components may use a widely known format for transmitting the data, such that a tool may be originally written to communicate over the back-end network according to a known format. Message formats may also utilize published definitions, such that components may reference the published definitions to interpret the contents of the message. Such published definition sets can be implemented directly on the component, such as the use of Internet browsers which contain information for interpreting HTML (hypertext markup language). Hybrids may also be utilized, wherein a portion of a format definition may be distributed to each component, while format definitions for specific message types may be stored at a third location, such that components can access the definitions for specific messages, and also be informed of the necessity of sending the message in the first place by reference to the material contained at the third location.

Tools which comprise the back-end system may differ from function to function. One vendor may make a particularly effective tool for monitoring the performance of a hosted application, while a different vendor provides an effective tool for tracking service requests. The use of varied tools to handle varying back-end functions limits the ability to automate responses which are dependant upon information being sent from a sending computer to an address, unless the sending component is originally programmed with instructions identifying destinations for each message.

The ability to provide this functionality to each computer in an application hosting system is severely constrained. The destination of each message sent from a computer may be dependant on both internal and external considerations. Internal considerations may include the contents of the message, and the identity of the computer sending the message. External considerations could include identifying a responsible party for responding to a specific message from a sending computer. Accordingly, when a message is sent by a component, the identification and resolution of any events or conditions described in the message presently requires the involvement of human operators before indicated responses can be taken. The involvement of human operators delays the resolution of any situation indicated by the message, and thus may adversely affect the performance of the component which initiated the message.

An example of such a situation would be the transmission of a fault message related to application software. Such a message may be transmitted to a hosted application customer associated with the application software. Once the message is received by the customer, the customer must be able to determine corrective actions, and who should be notified of the necessity of initiating the corrective actions. Such messages may be transmitted to the customer via posting at a portal into the management system, further delaying resolution until the customer accesses the portal.

Alternately, requests made by a customer to an application hosting system also require that determinations be made regarding how the request should be handled, and additionally what management functions need to be informed of the request and any proposed response. Thus, delays inherent in making such determinations delay resolution of the request, delaying any benefit to be achieved under the request.

SUMMARY OF THE INVENTION

The present invention relates to a system and process for resolving messages from application components to back-end systems. The system comprises a standardized message definition which uses a tagged field format through which application components communicate to a message handler. The message handler includes a resolver that utilizes the information contained in the tagged fields of messages to determine correct resolution and routing of the message. The resolver applies rules that define actions to be taken and recipients of information based on the contents of the message. The rules may be pre-defined by a customer associated with an application component generating a message, based on common rules applied to components generally, or based upon service rules associated with the service provider, such as level of service subscriptions or other characteristics, or based on a combination of any or all of the above bases. By utilizing published message formats, the present invention provides a platform independent framework for exposing application hosting back-end systems to customer applications.

The present invention may be embodied in a network-based automated message handling system for initiating responses to messages transmitted through the network by application components without requiring operator intervention. The system may include at least one customer-defined message handling rule which defines actions desired by a customer to be taken in the event of a message indicating a condition or event. The system also includes a message handler which receives information messages transmitted by application components, and analyzes the messages to determine whether the contents of the message indicate that the contingent actions should be taken. The message handler may generate her messages when the contents of the message indicate that the contingent actions should be taken. The recipients of the further messages may be identified by the customer-defined message handling rule.

In an alternate form the present invention may be embodied in a process which includes the steps of receiving from a customer at least one customer-defined message handling rule, interpreting the components of the information message to determine whether the customer-defined message handling rule should be applied to an information message based on the contents of the information message, applying the customer-defined message handling rule to the information message when the contents of the information message so indicate, and generating and transmitting a forwarded message in accordance with the customer-defined message handling rule when application of the rule is indicated by the contents of the information message.

In a further alternate form, the present invention may be embodied in a computer program which implements a process for determine from a customer at least one customer-defined message handling rule, and making the customer-defined message handling rule available to a message handler via a computer network. The customer-defined message handling rule identifies circumstances under which actions should be taken by a message handler, and actions to be taken by the message handler when the circumstances are met. Customer-defined message handling rules may be limited to affecting messages related to the customer providing the rule.

The rules which may be applied in the present invention include service-based rules which are dependant upon a level of service subscribed to by a customer, as well as common rules which are applicable to all customers. The messages may be forwarded as e-mail, as pages, as faxes, or as Internet posts to other systems.

The customer-defined rules may be determined through a wizard presented to a customer. The wizard may use references to other databases to determine characteristics which may be associated with a rule, such as application components to apply a given rule to, or potential recipients of a given rule such as by reference to a contacts list management tool.

Finally, the ability of the present invention to automatically apply customer based rules, as well as service-based and common rules, allows the automated handling of management tasks within the application hosting system. An example of such an automated process handling is the automated forwarding of messages such as associated with a provisioning request, where the individual messages initiate tasks which form the steps inherent in a provisioning request, allowing the provisioning request to be handled in a rapid and efficient manner.

Other features and advantages of the invention will be apparent from the following description of the preferred embodiment, and from the claims.

BRIEF DESCRIPTION OF THE FIGURES

FIGS. 2A through 2D show an illustrative schema defining an application software error message.

FIG. 3 shows an illustrative customer-defined rules query wizard for identifying a message class to apply a customer-defined rule to.

FIG. 4 shows an illustrative customer-defined rules query wizard for identifying a component to apply a customer-defined rule to.

FIG. 5 shows an illustrative customer-defined rules query wizard for manual entry of recipient identification for automatically forwarded notifications directed to software fault messages.

FIG. 9 shows an illustrative portal for providing customer access to back-end services.

DETAILED DESCRIPTION OF THE INVENTION

Figure 1:
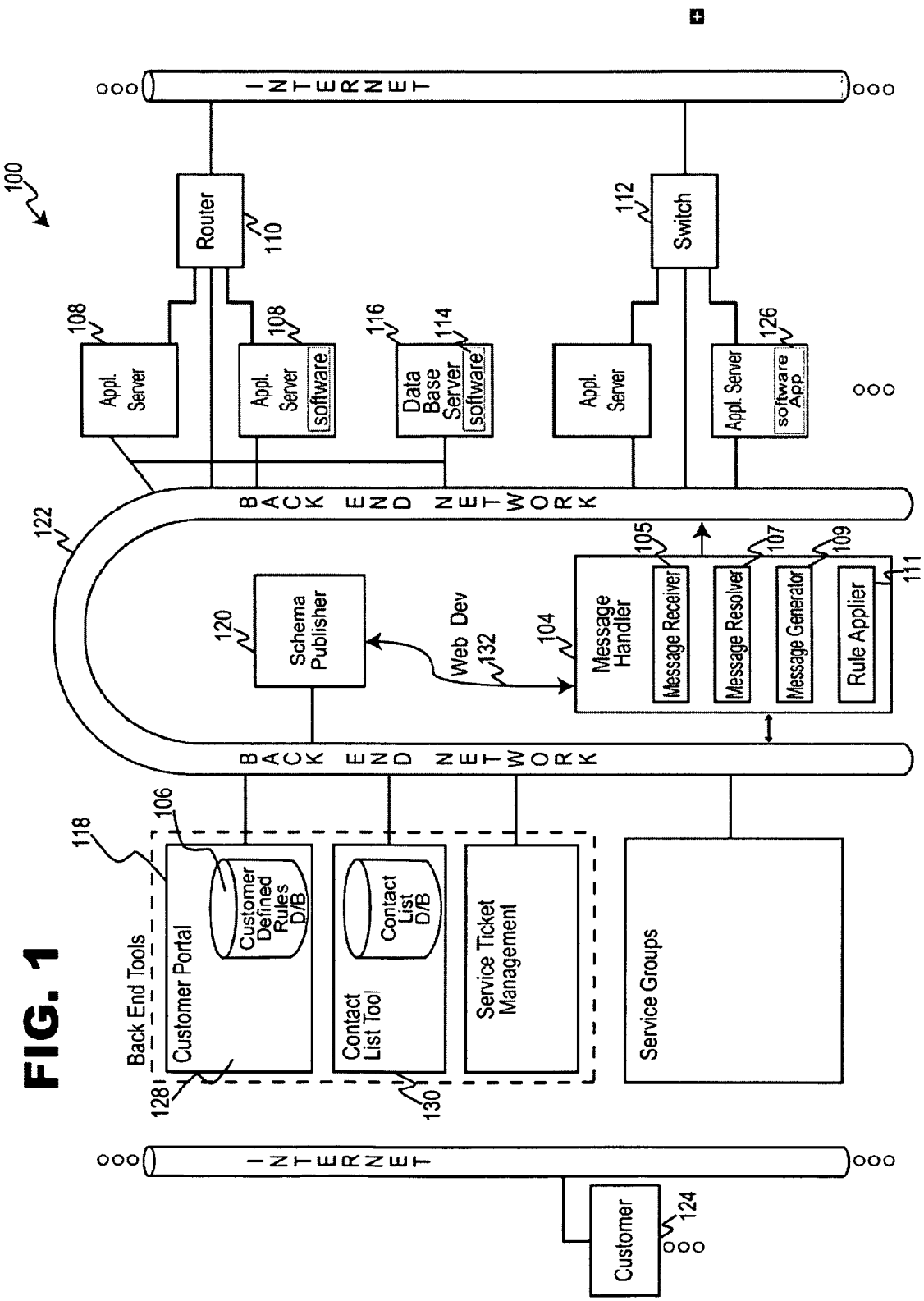
FIG. 1 shows an application hosting system utilizing a customer-defined rules database for message handling.

Referring particularly to FIG. 1, wherein like numerals represent like elements, there is shown an application hosting system 100 embodying the present invention. The system of the present invention may be incorporated into a network application hosting system 100, such as that utilized to host Internet applications for customers. The message handling system 102 of the present invention in a basic embodiment includes a message handler 104 and a customer-defined rules database 106. The application hosting system 102 may include but is not limited to application servers 108, routers 110, switches 112, software components 114 such as software programs and services, as well as tools used to administer the hosted application system. Such components of the application hosting system are hereinafter referred to collectively as "application components". In order to most efficiently provide the application hosting system 102, many of the functions associated with the application are hosted on separate components, frequently with more than one component carrying out a function to provide sufficient capacity to meet demands for the function. For example, two (2) application servers 108 and a router 110 may be used to host an application, with a third server 116 being used to store data for the hosted application. Each of these devices may have software packages 114 installed thereon, with remote tools such as a customer portal 118 being used to monitor the performance of the individual components and software packages. Accordingly, the number of components involved in a hosted application system 100 can become quite large.

The message handler may include a message receiver 105, a message resolver 107, a message generator 109, and a rule applier 111. The message receiver 105 may be a functional group implemented in software which allows the message handler 104 to receive messages from application components. The message resolver 107 may be a function implemented in software which allows the message handler 104 to interpret the contents of a message in accordance with standard message structures. The message generator 109 may be a function implemented in software which allows the message handler to generate messages in accordance with pre-determined instructions, wherein the pre-determined instructions may be embodied in the software forming the message handler, or may be rules stored external to the message generator. The rule applier 111 may be a function implemented in software allowing rules defining responses to received messages to be applied to the contents of messages to determine whether individual rules should be applied to the message based on the contents of the message. Although these functions are illustrated as being distinct in the present illustration, the functions may be integrated into a single software package capable of performing the functions. In a presently preferred embodiment, MICROSOFT BIZ-TALK™ software is being used to enable these functions.

Standard message structures, called schema, are provided such that a common message structure can be interpreted by sending and receiving computers. Individual schema are provided for performance monitoring, asset management, case management, billing, and operations policy.

The function of the schema is to allow the message handler 104 and other components within the application hosting system 100 to be able to interpret the contents of a message. If a message arrives at a message handler 104, with a field having a value of 0.99, the message handler would not be able to determine whether an action was indicated based on the data. By defining the field within which the 0.99 was contained, the message handler would be able to understand the context of the value, such that decisions could be made accordingly. For example, the field could be defined as memory utilization, expressed in percentages, such that a message handler would understand that the memory utilization on a specific component was 99%, indicating that the component was likely having speed degradations due to inadequate free memory.

In FIG. 2 there is shown a schema associated with a software fault notification message. The header 202 of the file identifies the message type. The characteristics associated with fields and elements are also defined in the schema 204, 206. Schema definitions may be published on an application hosted by the application hosting service to provide access to the schema to outside parties, or may be published through a tool on the back-end network. In the presently preferred embodiment, the schema are stored on the message handler, in this case a software tool called MICROSOFT BIZ-TALK™, as document definitions. As messages enter a MICROSOFT BIZ-TALK™ interchange, they are validated against the schema referenced in the document definition. The schema may alternately be stored on a separate server accessible through Web Distributed Authoring and Versioning ("WebDAV") 132 (shown in FIG. 1), which is an extension to the HTTP 1.1 standard that exposes a hierarchical file storage media, such as a file system, over an HTTP connection.

In a conventional message format, fields are predefined, and may be included in the message whether the value is relevant or not. Such fixed field messages provide for the ability of the contents of a message to be interpreted, but do so inefficiently, since fields must be included whether relevant. By relying on a tagged field message format, such as XML, the header of the message can identify what fields are contained within the body of the message, allowing interpretation of the data without requiring the inefficient utilization of fixed-field messages. Accordingly, only necessary fields need to be provided for in the body of the message, allowing fields to be added to the message format as required. Finally, the definition of the header information is provided in the schema, allowing the basic definitions of how to interpret the tagged-field message to be known to a component receiving a message from another component.

The use of such schema allows components to report events and conditions without reference to the identify or existence of recipient components. Accordingly, logic does not need to be built into components to enable the component to function within an application hosting system embodying the present invention.

More particularly, individual components will preferably be written such that messages sent from the component follow the pre-defined schema. Within a component a piece of data may be assigned a variable name. To report this data to an entity away from the component, the component may not need to know how the data will be named by a recipient. As long as the data is properly formatted within a transmitting message, a receiving computer will be able to determine from the field tags the context of the data.

Furthermore, the messages may use the message handler as a recipient, with the message handler determining message recipients based on the identification of the sending component. As shown in FIG. 1, the back-end network is illustrated as a loop wilt each component communicating with the back-end network. Logically, the message handler receives each message from components, and re-transmits the messages as required. Accordingly, the system of the FIG. 1 may alternately have each component connected directly to the message handler, rater than through a back-end network, such that communications between components route through the message handler.

Individual element type definitions may be further defined in an XML name space 120, or system defied area for publishing schema for use in the system. Different schema may be defined based on the various contents for which it is desired to transmit information from one component to another, as well as based on the individual data types.

It is known that the occurrence of events within a hosted application system may indicate that a response should be made upon the occurrence of the event. The response indicated is generally constrained by characteristics of the event itself. For example, if a software component reported that a memory protection fault had occurred, it is unlikely that anyone would consider the indicated response to be to replace the video monitor.

A first step for handling messages indicating a required response is to determine who should be notified of the message. This function is handled in the illustrated embodiment of the invention by a message handler 104. The message handler 104 reviews the contents of messages flowing along the back-end network 122, and applies rules (or has rues applied to) the contents of the message to determine whether and which components need to be informed of the message and its contents. The message handler 104 of the present invention may be embodied in a server that is distinct from other components associated with the application hosting service. Alternately, the message handler could be embodied in multiple servers, with the workload associated with message review distributed between the multiple servers. Alternately, the message handler may be distributed among individual recipients of messages, such that the individual recipients are responsible for reflecting received messages to other recipients.

The incorporation of the message handler into the application hosting system relieves the individual components of the need to determine destinations for messages. Messages are sent to the message handler, which determines indicated recipients.

Presently, the message handling function is being enabled using MICROSOFT BIZ-TALK™ software. This software is responsible for identifying farther recipients of a message. Forwarded messages, in their original form or in a rewritten form, may serve as instructions to other components within the application hosting service. Accordingly, a forwarded message may have further content appended to the message before the message is forwarded, or have content removed.

In order to cause messages to be reviewed by the message handler 104, the messages may be originally transmitted from a generating component to a fixed address, specifically the network address of the message handler 104. In such an implementation, the message would contain, as a field within the body of the message, the intended recipient of the message if an intended recipient existed.

The generation of messages is dependant on the hosted application components. Basic components, such as the operating system on which a hosted application is running, include provisions for monitoring the operating conditions of the application software. These services may also include functionality for monitoring the operation of the service itself. The services may typically be written without conformity to the message handling system of the present invention, such that messages and warnings indicating events or conditions within the software are not transmitted in the format necessary to allow the message handler to interpret the message. This limitation applies to messages associated with hardware components as well, which may typically utilize software to control the function of the hardware component. The provision of an application programming interface to the component allows messages generated by the component to be formatted in accordance with the format expected by the message handler.

Where the component does not allow for integration of an application program interface ("API") to perform message formatting, the message may be routed through an indirection to a translating tool which formats the message in the standard format before forwarding the message to the message handler. The use of translating tools requires a mechanism by which a message can be intercepted before retransmission to the message handler, while retaining information associated with identifying the intended recipient of the message.

Finally, back-end tools may utilize agents which are resident on application components as a means of monitoring the operation of an application component. A typical example of such an agent would be an agent placed on a server for the purpose of monitoring memory usage on a server being used to host a customer's application. Such an agent may be placed on the tool, with usage messages from the agent being intended for transmission to a portal tool, or other tool for distributing the operations information. Adaptation of the agent to cause such messages to be fast routed to the message handler allows the contents of the message to be monitored to determine if further action is required.

Although in the case of the memory usage tool, the tool previously could be used to cause the initiation of further action based on the memory usage (such as a notification function), the distribution of functions to disparate tools limited the ability and efficiency with which further action could be initiated. For example, if four servers were being used to host an application, with one server off-line, memory usage being high while the server was off-line could be tolerable, since the off-line server could be expected to return on-line, thereby reducing the memory usage. If the high memory usage occurred at a point in time where all components were fully functional, the high memory usage could indicate that memory should be added to the component experiencing the high usage. By allowing cross-referencing of information between tools, the effectiveness and efficiency of automatically initiated responses can be improved.

In a basic embodiment of the present invention, the message handler may be limited to initiating actions based on rules provided by a hosted application customer 124 for a hosted application 126. Limiting the rule set allows efficiencies to be gained by the application hosting service and the customer 124, while providing the greatest benefit with regard to customer satisfaction. Additionally, limitation of the rule set to customer-defined rules may limit the exposure of the application hosting service to customer displeasure based on automatically initiated actions, since any action could be attributed to the instructions of the customer.

The ability of the message handler 104 to correctly determine what the proper response is to receipt of a message from a component of a hosted application system 102, the message handler must have an internal set of rules which define responses. Simple responses may include, for example, a notification to a hosted application customer 124 when a hosted application 126 exceeds a memory utilization threshold. More complex responses may be directed to the initiation of corrective actions when a fault is detected. There are no limitations to the message content to which customer-defined rules can be applied, as a customer-defined rule may be written to provide a customer desired response to any event within the system, as long as the event is identifiable based on the contents of a message.

Simple customer based rules may define notification strategies to be enacted upon the occurrence of an event. For example, if a software fault occurs in application software written for customer by a third-party vendor, the customer 124 may desire that the third party vendor be immediately informed of the software fault. Such a message could be automatically handled by a rule specifying that when a software fault occurs within the application software, that an e-mail message is transmitted to the third-party vendor informing the third party vendor of the fault. Alternately, the notification could occur by page, by facsimile transmission, or by generation of a telephone call using voice synthesis capabilities.

In addition to customer-defined rules which are dependant only upon the occurrence of an event, customer-based rules which reference an outside reference may also be implemented. For example, if a contacts list tool, such as 130, is implemented within the back-end systems of an application hosting service, the notification instruction could be directed to an individual or party identified by a title, where the actual individual or party associated with the title is referenced in the contacts list tool. Accordingly, if a customer desired that a service representative be notified when a message was received from a component, the message handler, based on a rule identifying "customer service representative" as a recipient, could reference a contacts list tool to determine who the present "customer service representative" is, before forwarding a message to the present service representative. The use of the indirection allows the creation of organizational responsibility outside of the customer-based rules, but allows the customer based rules to implement the externally defined organizational responsibility without requiring that the customer based rules be updated each time a change occurred in the organizational responsibility definitions.

Finally, customer based rules may also branch based on externally derived information. For example, a customer may define message forwarding priorities based on a reported event and the existence of additional factors. For example, where multiple servers are being used to host an application, a report of high memory utilization may initiate a review of the distribution of information requests being made by a router associated with the hosted application. Where the router is reporting normal distribution of incoming information requests, the customer may desire that a third party vendor responsible for the application software be notified by e-mail. If the router is reporting uneven distribution of incoming information requests, the customer may desire that a different party, one responsible for the function of the router, be notified of the condition rather than the third party vendor. Although simple, this example illustrates the ability of a rule to request information from an external source for use in determining what action to initiate based upon the received message and the external source information.

Figure 3:
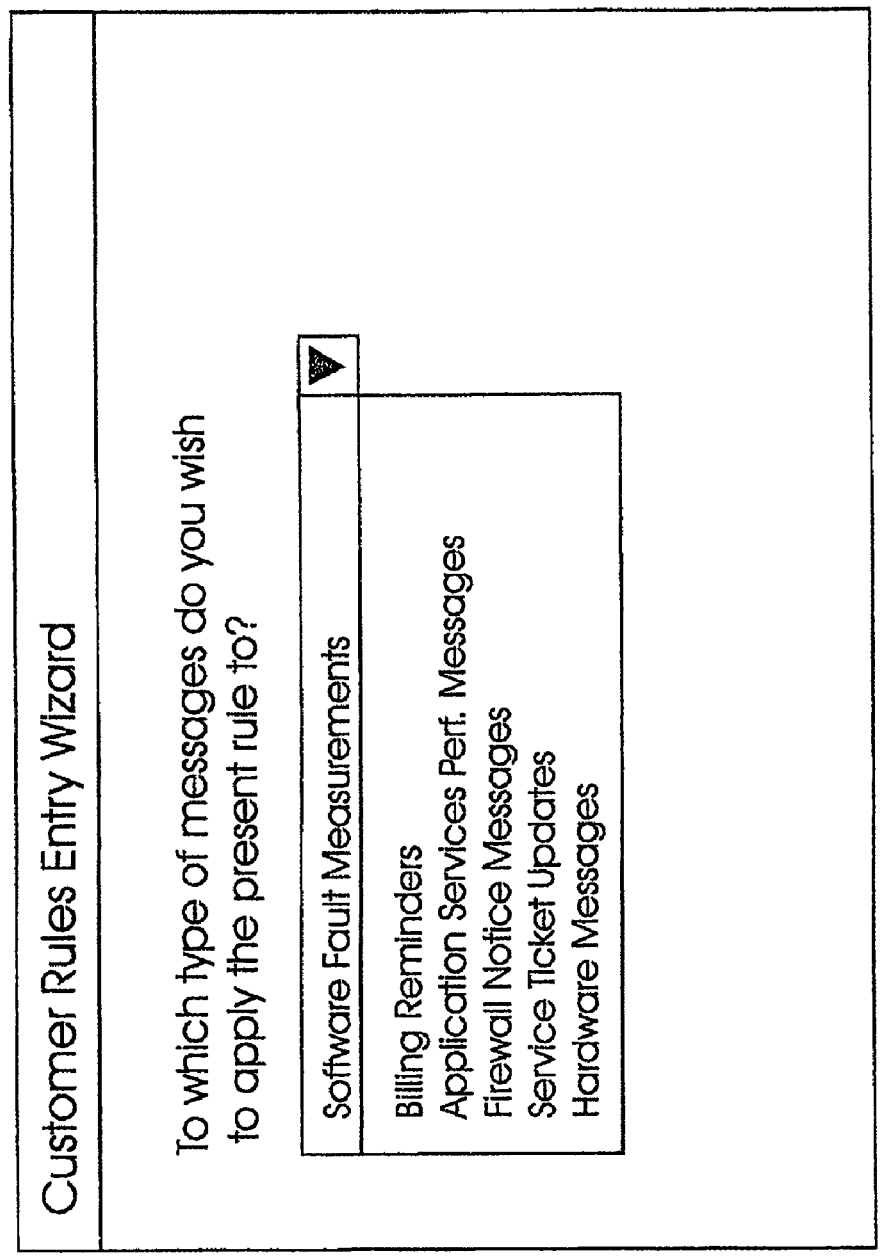
Figure 4:
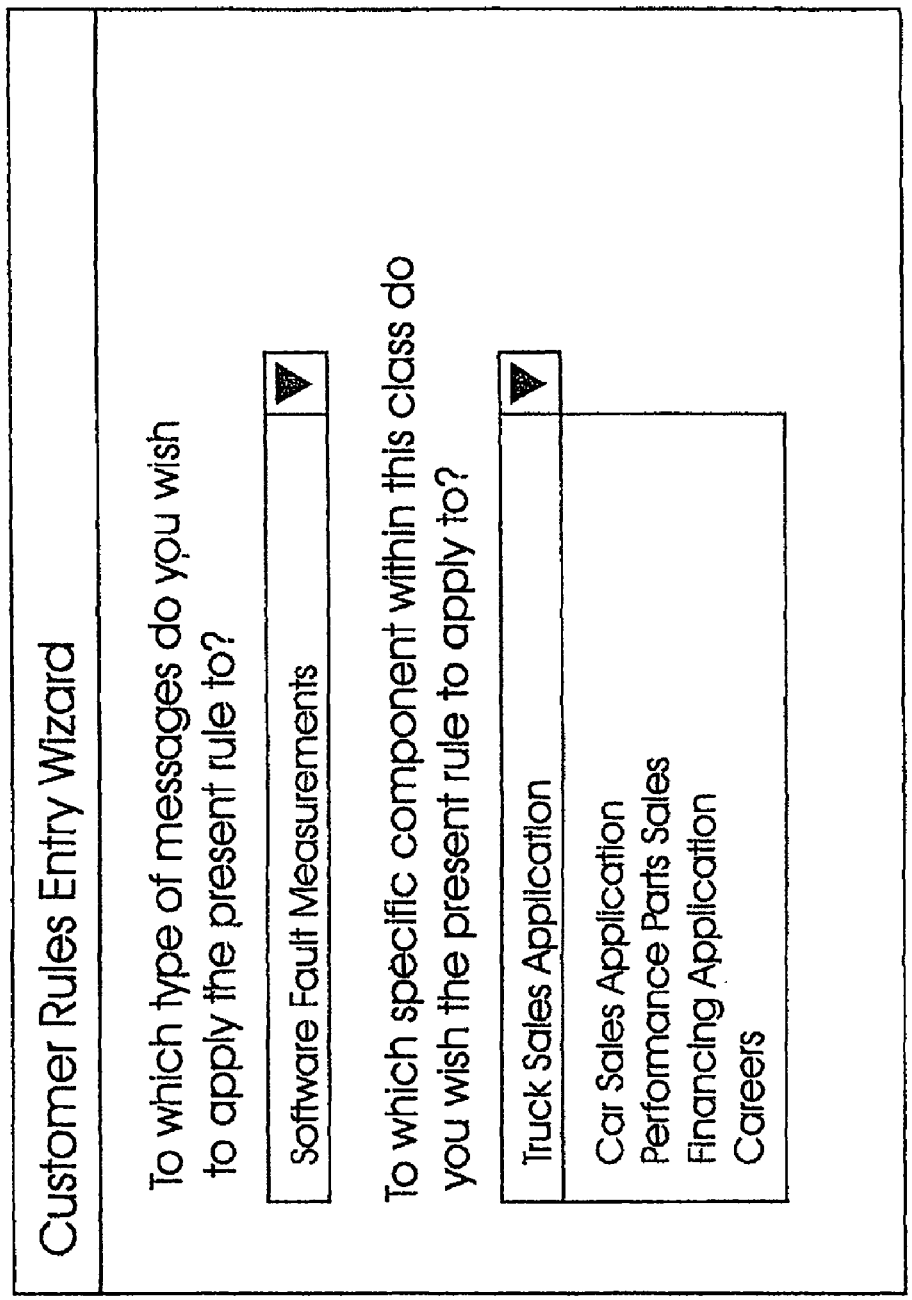
Figure 6:
FIG. 6 shows an illustrative customer-defined rules query wizard for identifying recipients of automatically forwarded notifications directed to software fault messages.

As shown in FIG. 3, which illustrates an exemplary customer-rules query wizard 302, a customer can be prompted to provide information regarding how notifications should be handled. A pull down box 304 may be provided to allow a customer to select a certain class 306 of messages to apply a customer-defined rule to. The pull down box 304 may include classes such as performance notices, software fault notices, billing notices, of contact list change notices. As shown in FIG. 4, the customer may also be presented with a list of specific components within a class for which a presently being entered rule should be applied. If the class selected was directed towards software faults, a customer may desire that faults associated with third-party developed software 402 have a direct notification to the third party vendor. Shown in FIG. 5 is a query wizard allowing manual identification of desired recipients of forwarded copies of the message. Alternately, as shown in FIG. 6, once a component to apply the rule to has been selected, the wizard may display radio buttons 602 allowing a customer to identify parties 604 for notification for messages within the present class/component. The list of potential recipients may be derived from information contained in a contacts list tool, such that the options presented may be based on the specific situation of the customer entering the rule.

Figure 7:
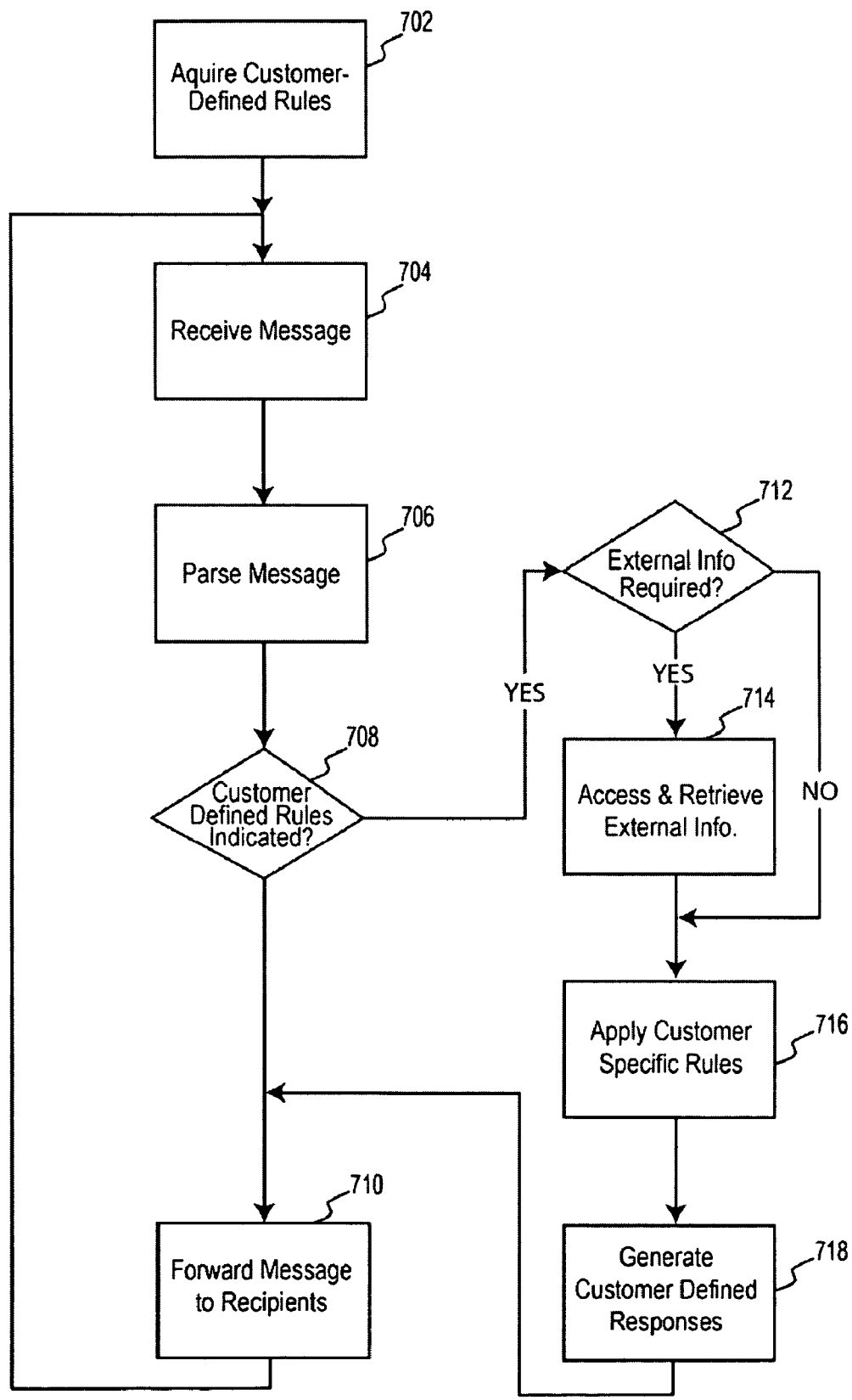
FIG. 7 shows details associated with a process for using customer-defined rules to handle messages as indicated by the contents of the message, where the customer-defined rules include indirections to other information sources for response generation.

In FIG. 7, a basic process implementing the automated handling of a message from an application component is illustrated. In step 702, customer based rules are determined. These rules can be determined by prompting a customer for desired responses to frequently seen events and conditions. FIGS. 2-6, discussed above, illustrate customer based rules related to notification procedures. Once these rules have been determined, the message handler reviews messages to determine whether a customer based rule should be applied. A message is received 704 by the message handler. The received message is parsed and interpreted 706 in accordance with a message definition. The interpreted contents of the message are then reviewed to determine whether one or more customer based rules should be applied. If it is determined 708 that no rules should be applied, the process continues 710 until the next message is received. If it is determined 708 that a specific customer based rule should be applied, then the specific customer based rule is reviewed to determine 712 whether any external information needs to be acquired to implement the specific customer based rule. If it is determined that external information is required, the external information is obtained 714. A specific customer based rule or rules may then be applied 716 to the message contents. Application may consist of forwarding actions associated with the contents of the message, for example, or may include the generation 718 of instructions or commands to other components to initiate actions. These examples are merely illustrative, and do not limit the scope of actions which can be undertaken when a rule is applied to a message. Once a specific customer based rule has been applied, the message handler may determine whether any other specific rules should be applied. Any other specific rules may then be applied as above. Once application of the rule or rules has been completed, the process continues 710 receiving and reviewing messages.

Figure 8:
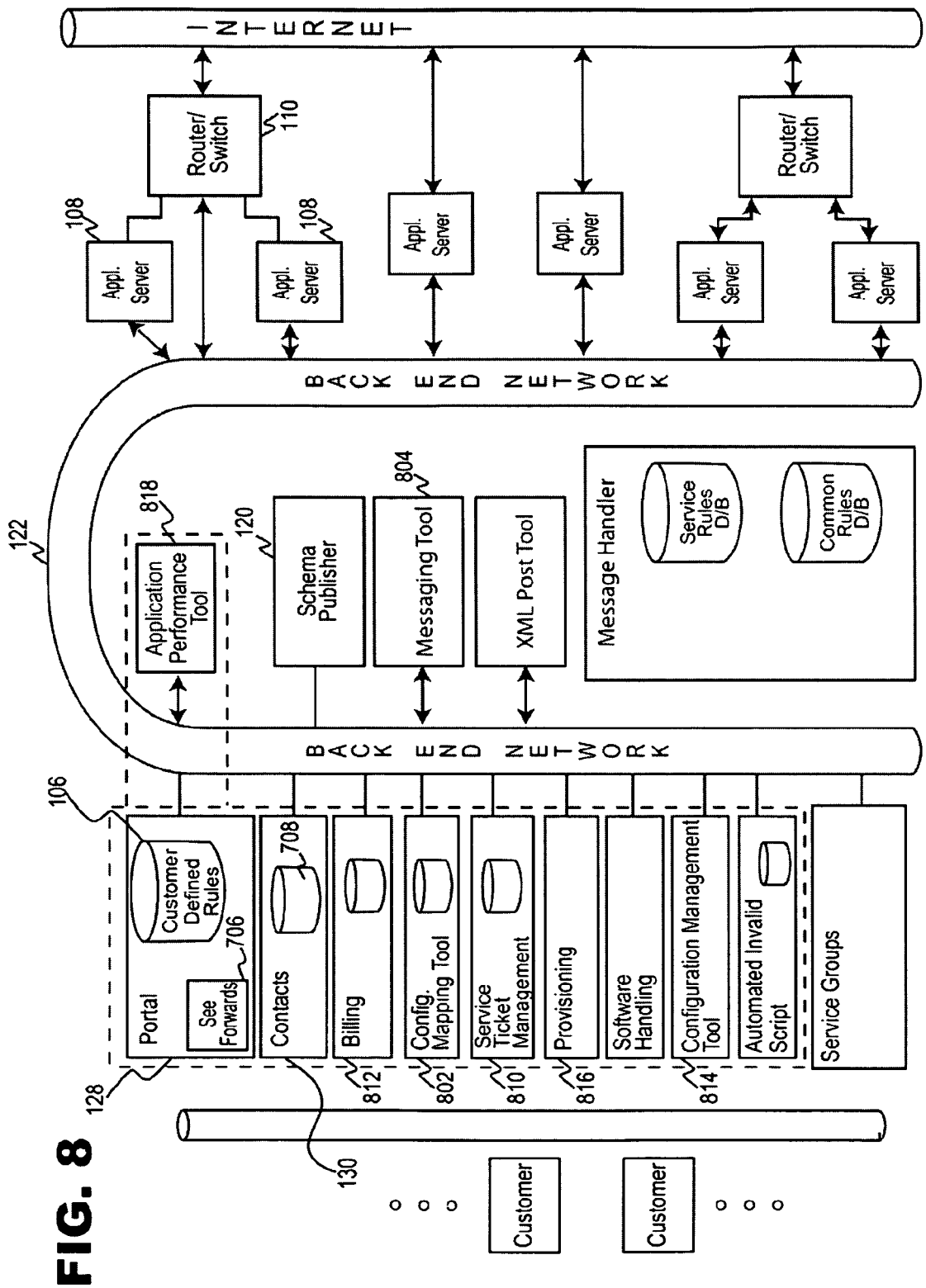
FIG. 8 shows an application hosting system utilizing common, service defined, and customer-defined rules for responding to messages.

In order to provide access to the customer rules wizard 302, as well as other information related to a hosted application, a portal 128 as shown in FIG. 8 may be provided to the customer 124 allowing the customer 124 to view information associated with a hosted application 126 and to also manage the hosted application 126. In addition to providing an interface for the customer 124 to define customer based rules, the portal 128 may provide access for the customer 124 to other functions associated with the application hosting service, such as maintenance of a contacts list within a contacts list tool 130, review of performance data associated with a hosted application, review of the hardware and software configuration of a hosted application, review or change of subscribed service levels, and request for changes to the configuration of a hosted application, such as the addition or deletion of software or hardware components.

The portal server preferably includes software allowing information displays to be generated and transmitted via the Internet to a customer. Methods for generating and transmitting the information to a customer are well known. The information itself may be organized based on the characteristics of the information. For example, the information displays can be segregated based on topics such as performance of the server or servers on which an application is hosted such as efficiency of memory usage or efficiency of distribution of requests between multiple servers, or usage metrics for the application such as number of visitors. The portal is preferably integrated with individual monitoring tools, billing information such as fees for service policies or equipment, trouble ticket tracking information for following up on submitted trouble notices or tickets, and contact information for parties responsible for the operation and/or maintenance of servers on which an application is hosted, as well as the operation of the hosted application itself. An illustrative portal interface is shown in FIG. 9. In the illustrated portal 900, the "App. Config." task 902 may be used to invoke a wizard for identifying customer-defined rules.

Returning to FIG. 8, a messaging tool 804 system may be included, allowing voice, pager, e-mail, HTTP POST, and/or facsimile notification, such that a customer may be notified upon the occurrence of an event without needing to be communicably connected to the Portal server. The destinations available which can be messaged through the messaging system may be interconnected to a contacts list tool 130, such that notifications regarding information obtained may be routed to interested parties beyond a customer associated with a particular hosted application.

Pager notification may be accomplished either by relying on a service which provides for the forwarding of e-mails to a pager, or by implementing an e-mail to pager capability within the message handler itself. HTTP POST forwards attached data in an original message, as opposed to providing data in response to an HTTP GET request. The post may be carried out using either SOAP or XML parsing. Under either method, the component sending the message to which the data is attached may build an XML formatted message based on the data, which can then be transmitted to the message handler 102.

The portal may preferably include security features 806 to control access to hosted application information. The security system may include the use of a user ID/password feature, or may use more advanced features such as public key encryption or user certificate methods. The method selected may be chosen based on the number of users a customer desires to have access to information through the portal, and the sensitivity of the information available through use of the method. Accordingly, multiple methods may be implemented, with information availability limited based upon the security method in use. Thus, a large corporation having an application hosted may have a high level access, through which all portal information may be accessed, secured through the use of a certificate on a high level managers computer. A lower level access may be based on user ID/password security, with limited information associated with each password. One password could enable access to billing information for the customer's accounting department, while a different password would provide access to site visitation information to a customer's marketing department.

As referenced above, a contacts list tool 130, which may be implemented as a separate tool available trough the portal tool or as an address book in the message handler, may be used to maintain records defining contact information associated with a hosted application. This information may define organizational responsibilities, as well as provide a centralized point to allow contact information such as phone numbers to be maintained. The records may identify both customer side and application hosting service side personnel associated with a hosted application. The information associated with the records may be stored by the contact information tool in a database 808. Information in the contacts list may be communicated to the portal trough a request message sent from the portal to the contacts list tool 130. Once the contacts tool 130 receives the request, the contacts tool 130 could respond to the portal by identifying information associated with the position for which information was requested. The list of positions for which information could be requested could be originally communicated to the portal by a contact tool as a list of positions in response to a positions available request from the portal, such that the portal could be flexibly programmed, i.e., would not need to know the positions available in order to generate a list of positions for which contact information is available for the for the portal may be obtained from the contact information tool.

The ability of components to transmit messages may be enabled by writing the application to write messages in XML format in compliance with the schema associated with the message handler. Alternately, software modules performing the function of translating messages from a components proprietary format into schema compatible with the message handler may be implemented, such that the modules intercept and reformat messages between the component and the message handle. The modules may also translate messages from the message handler to the component, as well as from the component to the message handler. A software developer's kit (SDK) may be optimally provided to developers of applications to assist in enabling the applications to transmit messages in schema compatible with the message handler. Such an SDK may incorporate tools such as a tool to validate the schema compatibility of messages transmitted by the component.

As discussed above, the provision of an interface or portal between a customer and the application hosting service facilitates the dissemination of information between the customer and the service. The portal also provides an efficient interface with which to allow a customer to manage a hosted application. This efficiency arises due to the co-location of the information upon which management decisions must be made with the controls for making the decisions.

The tools used to provide information to the portal may be the same tools used by the application hosting service to operate the application hosting service.

In the configuration shown in FIG. 8, the application hosting service to which the present invention is applied may include several tools for managing the application hosting service. These tools may include a service ticket management tool 810, a billing tool 812, a contact management tool 130, a configuration mapping tool 802, a configuration management tool 814, and others as required.

A billing tool 812 may be used manage billing functions, such as determination of customer financial obligations and status. Information for the portal is accessed from the billing tool database via a query agent, which is configured to generate queries based on the data table structure specified by the billing function tool. The queries may be communicated to the billing tool from the portal in the form of messages using the standardized system format, such that the message handler can pass and review the messages to determine if any actions are indicated (such as notification of an alternate billing contact).

A configuration mapping tool 802 may be included in the back end systems to track the inventory and configuration of components being used to host customer's applications. Such a tool simplistically is a database that identifies the components associated with a hosted application, however more preferably includes linkages between the identified components. For example, the database may identify software components as being specifically installed on identifiable servers, or specific routers as being associated with specific applications.

A configuration management tool 814 is a tool that is capable of determining the amenability of making changes to the components associated with a hosted application. For example, the configuration manager may determine the amenability to the installation of additional RAM into a specific server being used to host an application, or the amenability of a server to accept another hard drive. The configuration management tool preferably utilizes an expert system to apply a knowledge base regarding the amenability of requested modifications to a hosted application configuration.

A tool for presenting provisioning options 816 may also be incorporated, either within the portal, as a separate tool, or as part of a configuration management tool. The purpose of a provisioning tool would be to identify for a customer options available to the customer with regards to the components or service levels associated with their hosted application. Such a provisioning tool could make recommendations for configuration changes based on parameters associated with a hosted application. For example, the provisioning tool could be informed by retransmission of a high memory usage condition in a hosted application server (such notification being initiated by a service or common rule applied to an original notification message). Offers of assistance could likewise be filtered based on customer-based rules. An example of such a rule would be that the customer would entertain hardware suggestions, but not software or service suggestions.

Another tool may be used for tracking service tickets 810. Service tickets include, but are not limited to, service requests to add new hardware or software, to correct faults or deficiencies, and to change configurations of hosted applications. Service ticket information may include the requester of the ticket, a summary of the underlying service request, and entries identifying actions taken and the status of the service request. Another tool may be provided for monitoring hosted application performance 818. This tool may monitor parameters, including but not limited to, CPU utilization, disk space utilization, memory utilization, network bandwidth utilization, services status, network hardware utilization, and application availability. Information associated with the performance monitoring may be stored in a database (not shown) associated with the performance monitoring tool.

In addition to customer-based rules, common rules can be established for application to all hosted applications. Typically, these rules may include events or conditions which have common applicability across all hosted applications and components. For example, a message changing a service subscription level would need to be reported to a billing tool, but might also need to be reported to a contacts list tool if additional contacts are provided based on the new subscriber level. A configuration mapping tool may also need to be updated according to the change in service level, such that hosted application configuration information could be maintained. Message handling rules in these situations would be independent of a service level associated with a client, and could therefore be applied to all messages.

Although this example is based on a message from a portal to a tool, indicating a customer request to change a subscription level, the common rules can also be applied to other components. For example, a firewall monitoring tool may detect a sudden influx of information requests to a hosted application. A common rule may be provided that an on-duty security operator is notified by pager to determine if corrective action is required, such as if the sudden in-flux is due to a denial of service attack. Alternately, automated actions may be invoked where the influx is from a single address, such as the automatic initiation of a filter on the information requests, preventing information requests from the single address being distributed to servers hosting applications.

A third category of rules, hereafter referred to as service-based rules, which could be beneficially employed would be those rules dependant on an external condition relative to a reported event or condition in a message. For example, various message handling procedures, such as notifications and priorities for responses, could be based on service subscription levels. Offering a customer different service levels allows the customer to tailor service responses to the sensitivity of the hosted application, in light of the fiscal impact associated with the different service levels.

A simple example of a service-based rule is illustrated in a customer service representative notification response. If an event occurred within the components associated with a hosted application, such that the event required notification of a customer service representative, normal procedure could be to place the message in a message queue for the customer service representative, based on a first in, first out basis. If the customer associated with the component which has reported the event has subscribed to a higher level of service, a different priority could be placed on the message, of the message could be transmitted to the most available customer service representative. Alternately, the message could be transmitted in a more immediate format, such as via pager.

Service-based rules are rules preferably provided by the application hosting service provider. These rules may vary from customer to customer. For example, rules regarding to responses to events within a hosted application may be generated based upon a service level subscribed to by the customer. If the service offers standard and premium service levels, the rules for responding to an event may be dictated by whether the customer has subscribed to standard or premium service levels. Such a determination may be made by reference to an external database, such as a billing module which contains billing information defined by the service level, or by reference to a hosted application configuration tool, which may expressly identify the service level.

Alternate service rules which may be utilized, for example, may be location based or platform based. Where an application hosting service provider organizes components used to host applications at geographically disparate locations, such as by the formation of server farms, the responses to an event may be dictated by the specific server farm at which a component which has reported an event is located. Where different component types are used, different rules for each component type may be invoked. For example, several hosted application customers could request that Compaq brand servers be used to host their applications due to marketing agreements between Compaq and the customers, while the application hosting service provider uses Hewlett Packard servers for hosting other customer's s applications. A service rule could be applied such that events from Compaq brand servers result in one response, while similar events from HP servers result in a different response.

Figure 10:
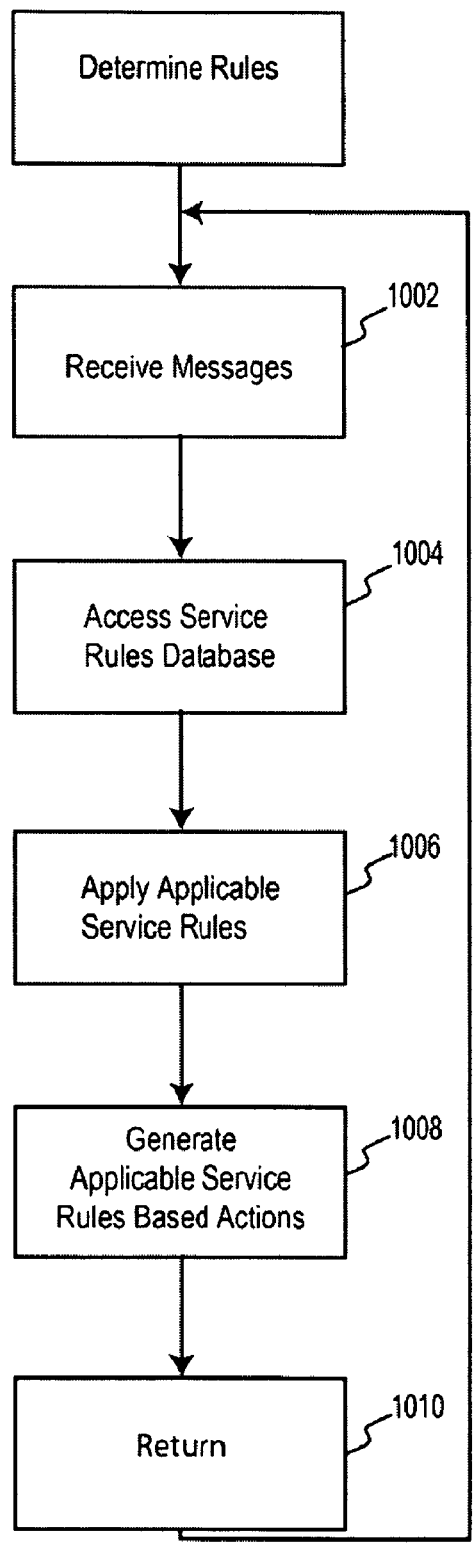
FIG. 10 shows a simplified process associated with use of service-based rules to handle messages as indicated by the contents of the message.
Figure 11A:
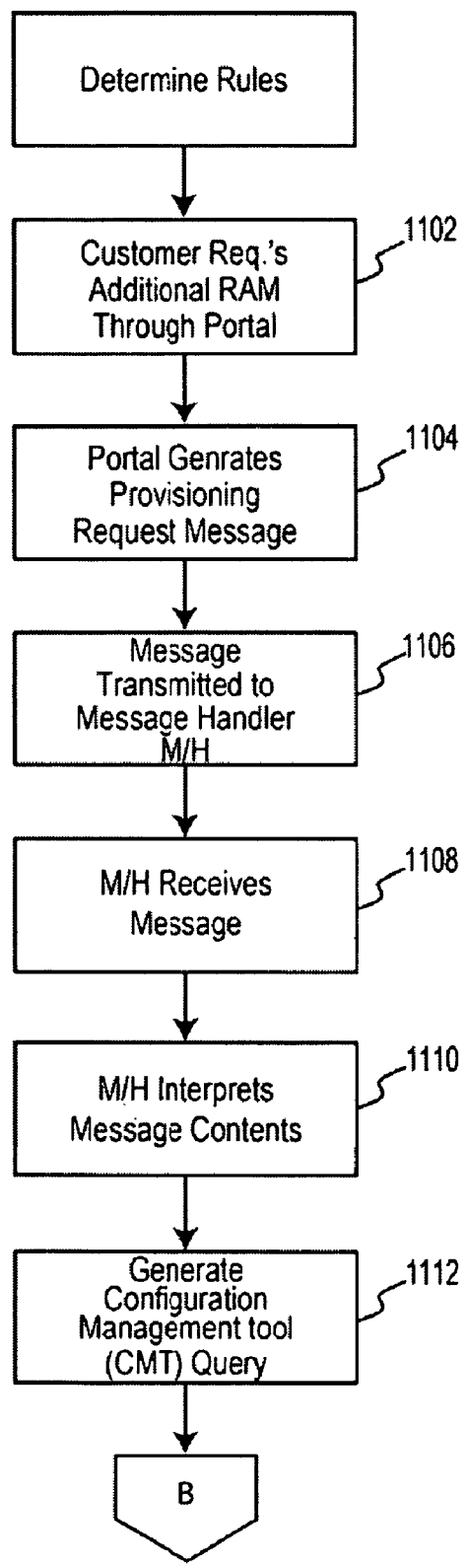
FIG. 11A through 11G show a process utilizing the application of customer-defined, service-based, and common rules to a message, specifically a request for the addition of RAM to a server hosting an application.
Figure 11B:
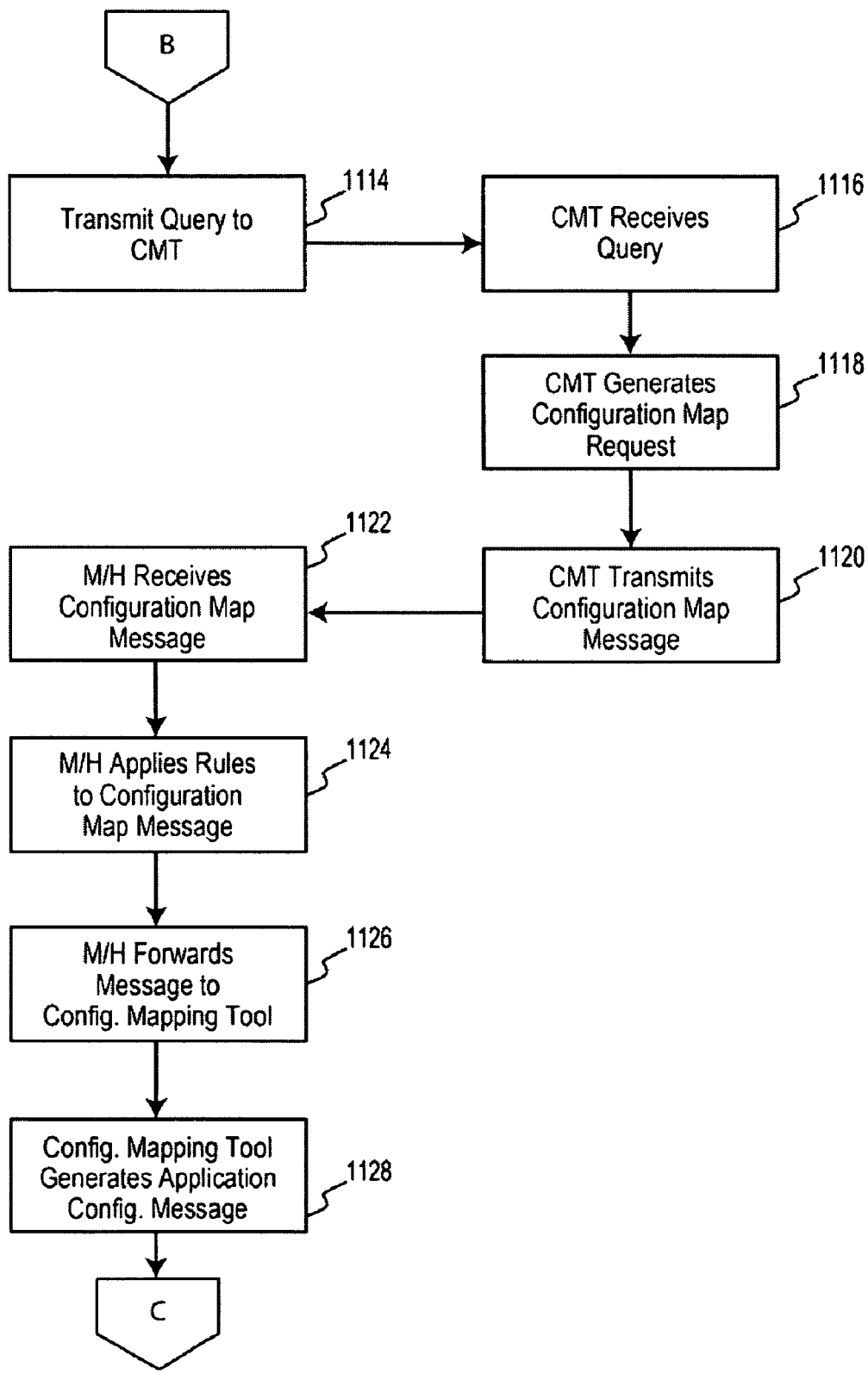
Figure 11C:
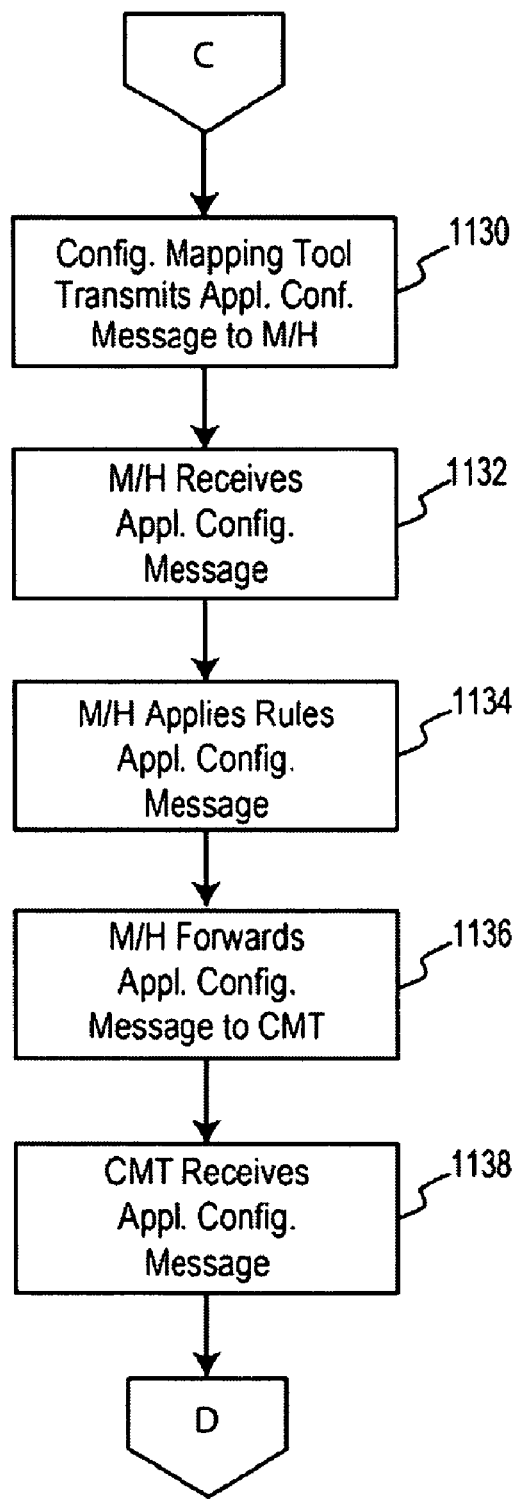
Figure 11D:
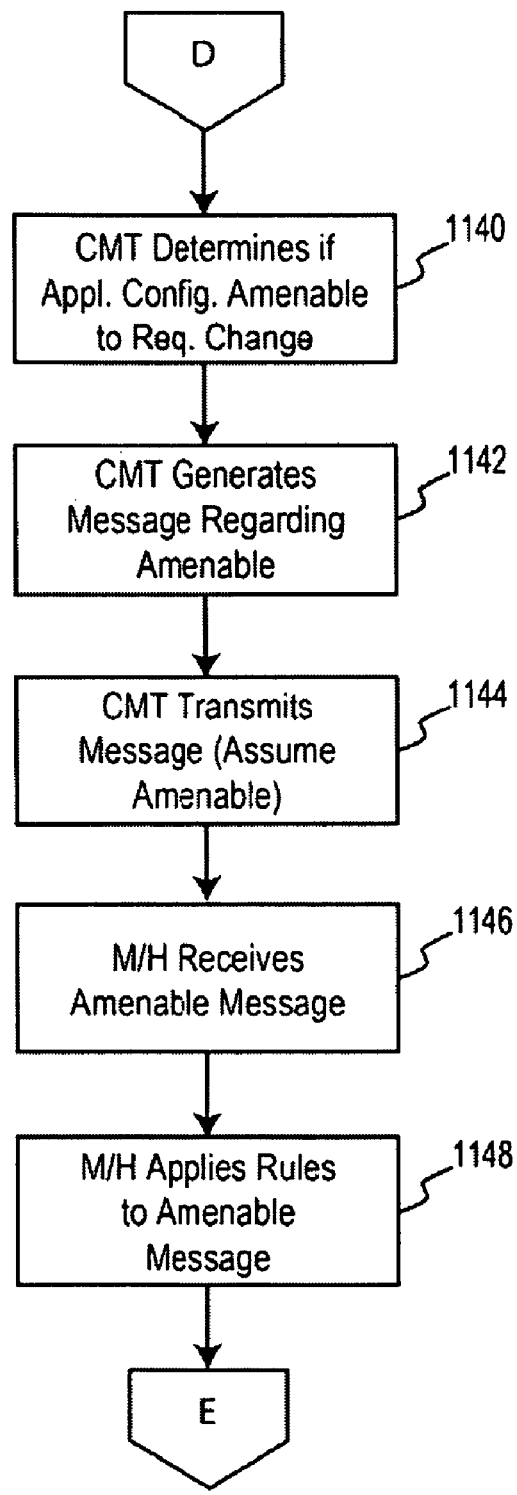
Figure 11E:
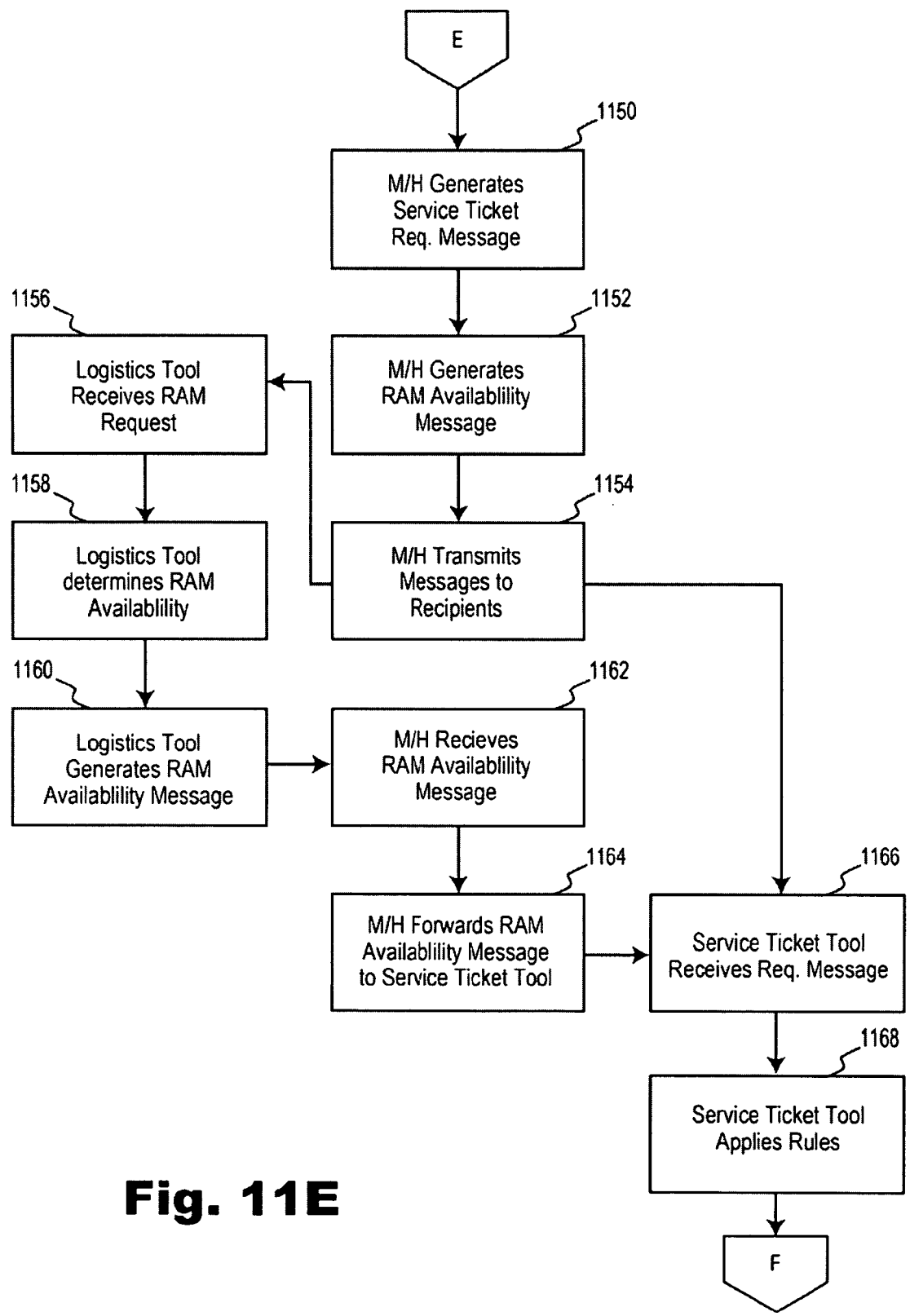
Figure 11F:
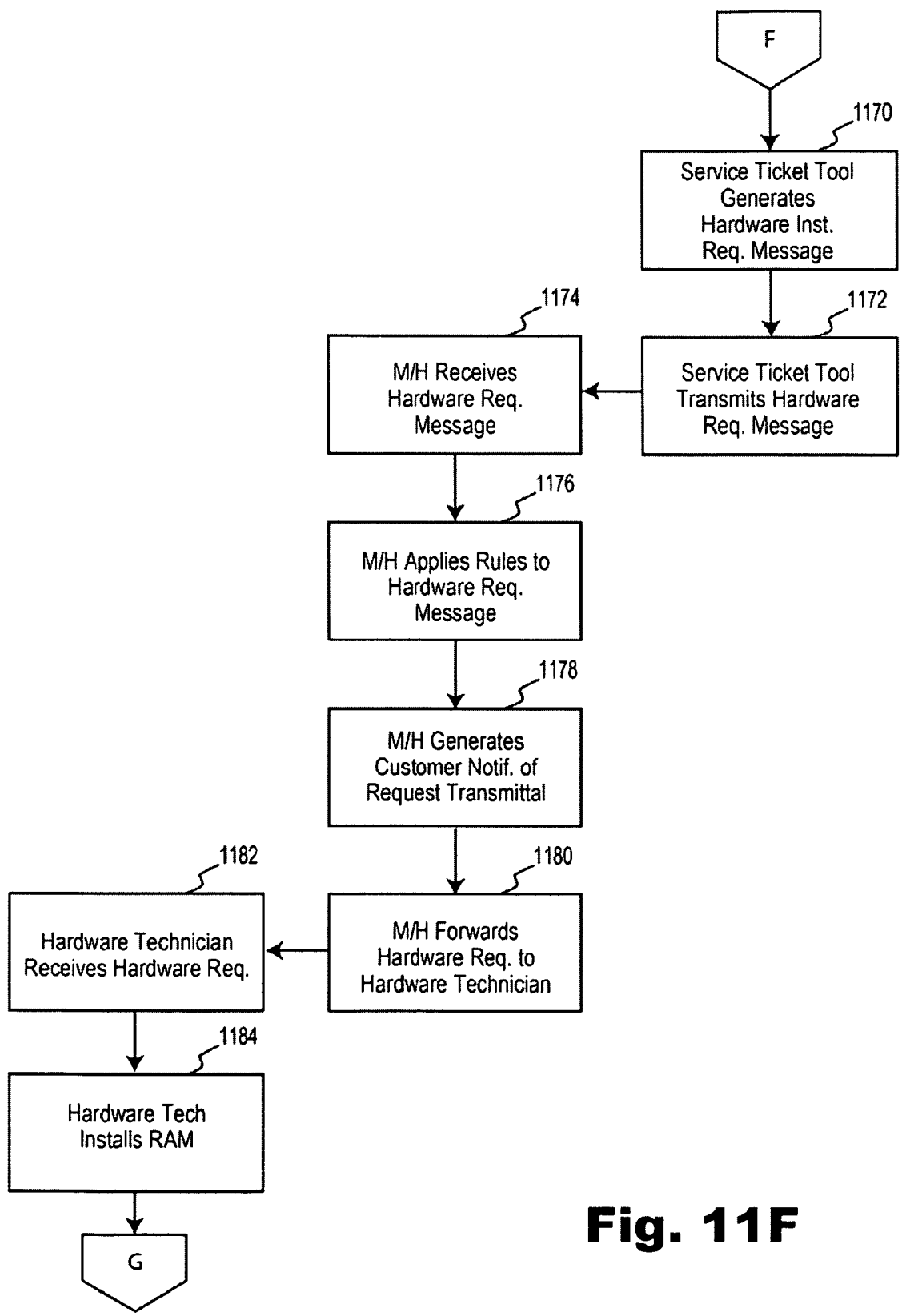
Figure 11G:
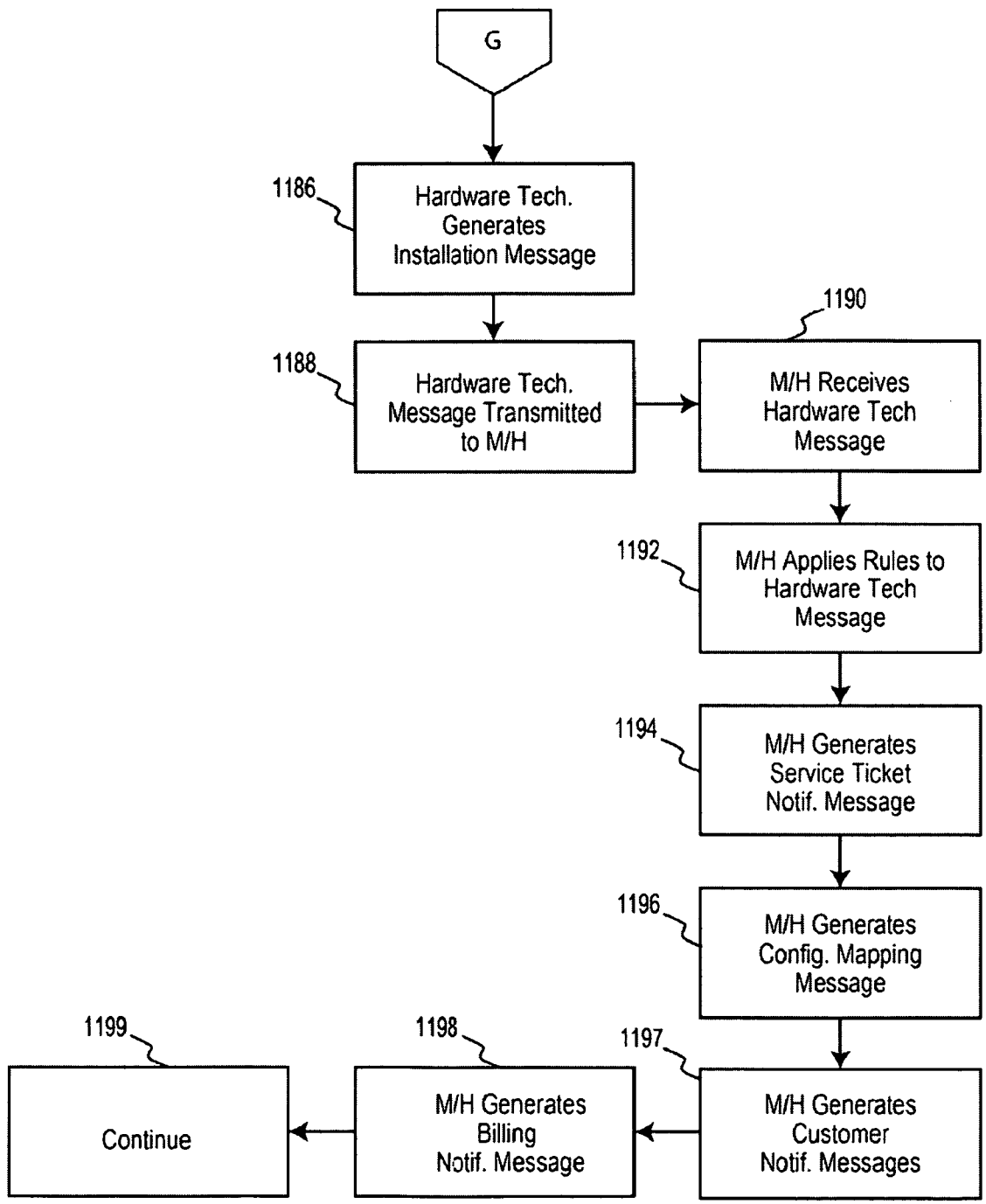

An exemplary process exhibiting handling a message based on a service specific rule is shown in FIG. 10. In step 1002, a message is received by the message handler. The message handler then accesses 1004 field definitions associated with the message. The application 1006 of the service rules to the message may be based on identification of rules applicable to field definitions, such that the presence of a field invokes application of specific rules to the contents of that field. Accordingly, once the field definitions associated with the message have been determined, applicable rules are applied to the contained in the fields and applicable service-based rule actions may be generated 1008.

For the purposes of the example shown in FIG. 11, a service ticket is a business method of tracking the status of an action. If a customer requests the addition of more RAM into the servers hosting the customer's application, the installation may follow several steps. In addition to the actual installation of the RAM into a server chassis, the billing department might need to be informed of the additional equipment which must be paid for. When a configuration mapping tool is incorporated into the back-end systems associated with an application hosting service, the information which the tool manages needs to be updated regarding the actual hosted application components in use. Also, a customer may be provided with information concerning the status of a requested service ticket, allowing the customer to make plans based on the status of the service ticket.

Service tickets generally follow specific routes based upon the underlying service associated with the ticket. Using the addition of RAM described in the previous paragraph, the request could be routed to an application configuration manager from which approval is required before the addition can be made. Such approval may be based on the availability of space within a server chassis for the requested additional memory. In order to evaluate the feasibility of installing the additional RAM, the configuration manager may request from a configuration mapping tool specifications defining the servers associated with the hosted application to obtain information upon which a decision can be made.

Once it has been determined that the RAM can be installed into the server chassis, a logistics function may be referenced to determine availability of the requested RAM. If the RAM is presently available, the logistics function can inform the configuration manager of its availability. If the RAM is not presently available, the logistics function can order the requested RAM, determine an availability date for the ordered RAM, and inform the application configuration manager of the availability date. From this, the application configuration manager can schedule a hardware technician's time to insert the RAM into the server chassis. Once the RAM is installed, the hardware technician can inform relevant tools of the installation, such as a billing tool and a configuration mapping tool. Additionally, it will likely be desired to inform the customer of the successful installation of the requested RAM. Using a service ticket tool, each step of is process may be listed, along with a scheduled completion date. Based on this information, a customer can track the progress of the installation of the requested RAM.

As shown in FIG. 11, this function, when embodied in the present invention, may be initiated by a customer entering 1102 a request to add RAM to the servers hosting the customer's application. The tool into which the request is entered may then generate 1104 a provisioning request message indicating the customer's desire that the RAM be added. Although the use of a portal tool for receiving the request may provide the most customer friendly method for initiating the request, other methods of generating the request may be utilized, such as manual encoding of a message in the standard format.

The provisioning request message may then be transmitted 1106 from the portal to the message handler. The message handler may then receive 1108 and interpret 1110 the message based on the message handler's knowledge of the format of the message. Based on the message's indication of a desired hardware upgrade, the message handler may generate 1112 and transmit 1114 a query to the configuration management tool to determine whether the hosted application configuration is amenable to having the requested RAM added. The configuration management tool receiving 1116 the query may generate 1118 a query to a configuration mapping tool in order to determine information describing the hosted application configuration, to allow the configuration management tool to determine whether the requested RAM can be added to the existing equipment. Alternately, knowing that the application configuration information will be required for the configuration management tool, the message handler may include the information request as an action with the configuration management tool identified as the recipient of the information. The determination of the messages to be sent and their recipients in this case may be made according to common rules or service-based rules, depending on the particular application hosting service to which the invention is applied.

The transmitted configuration map request is received 1122 by the message handler, which applies 1124 customer-based, service-based, and common rules to the contents of the message. In the present case, the rules could indicate that no action other than forwarding is indicated, such that the message handler would merely forward 1126 the configuration map to the configuration mapping tool.

The configuration mapping tool may generate 1128 a message describing the hosted application configuration based on data contained within a database for the configuration mapping tool. The data is preferably maintained by recording additions or removals of hardware or software as the additions or removals occur, as indicated by configuration change messages generated via the message handler. The configuration mapping tool would then transmit 1130 the message containing the configuration description to the message handler.

The message handler receives 1132 the message from the configuration mapping tool, and applies 1134 the rules to the contents of the message to determine whether additional actions are indicated. In the present example, no alternate actions may be indicated, such that the message handler merely forwards 1136 the application configuration message to the configuration management tool.

Once the configuration management tool has received 1138 the application configuration map, the configuration management tool may determine 1140 whether the hosted application is amenable to the requested additional hardware or software, which for the purposes of this example is a request to add RAM to a server for a hosted application. The configuration management toot may respond to the message handler whether or not the requested additional RAM is compatible with the application configuration by generating 1146 an amenable message if the application configuration is amenable to the addition of the RAM. If the configuration management tool responds that the RAM can not be added, the message handler may forward a denial to the customer who originally made the request. Additionally, the message handler may respond to a service-based or common rule and inform other parties of the denial, such as an account manager responsible for the customer. The addition of the dissemination of the message to relevant parties may allow the application hosting service to maximize customer satisfaction by allowing an individual such as a client manager to intervene when such a denial is generated, allowing the client manager to suggest other alternatives for attaining desired performance from a hosted application.

If the configuration management tool responds that the RAM can be added, the message handler can forward the message to the requesting customer, and query whether the customer desires to have the RAM added. If the customer indicates his desire to have the RAM added, the customer indication, in the form of a message, may be sent to the message handler. The message handler may then act upon the contents of the message in accordance with the pre-established common, service-based, and customer-based rules.

The message handler may generate 1150 a message to the service ticket management tool to open a new service ticket. The information used to request the new service ticket record may be determined by reference to the rules. For example, the previously discussed customer-defined notification elections can be included in the service ticket request and information, such that parties identified by the customer as being desired recipients of information notices concerning the progress of the service ticket are identified to the service ticket tool as being desired recipients of status notices.

The message handler may also generate 1152 a RAM availability request to a logistics tool responsible for inventorying and ordering necessary hardware. The logistics tool may receive 1156 the message, and determine 1158 whether or not the requested RAM is available. Typically, the tool would check an inventory database to determine if the RAM was on hand, or order the RAM from an outside supplier if the RAM were not available. The status of the RAM, either on hand or ordered, and an availability date, could then be transmitted to the message handler via a RAM availability message generated 1160 by the logistics tool.

Once the message handler has received 1162 the RAM availability message, the message handler may apply rules to determine whether actions are indicated based on the contents of the RAM message, which are most likely not indicated, and forward 1164 the RAM message to the service ticket tool to inform the service ticket tool of the availability of the RAM.

The service ticket tool may receive 1166 the message, and apply 1168 customer-based, service-based, and common rules to the contents of the message. Typically, the service ticket tool can generate a schedule for the process of installing the RAM into the requested destination based on these rules, as well as determine who needs to be notified of the occurrence of milestones with the schedule of events, and what events need to be initiated by the service ticket tool. For example, the service ticket tool may determine that a message must be generated 1170 and transmitted 1172 to a hardware installation technician, informing him or her of the request to add the RAM the destination of the RAM, where and when the RAM can be picked up for installation, and when the installation must be completed by.

The transmitted hardware message is received by the message handler, which again applies rules to the contents of the message. The destination of a forwarded message may be determined by reference to a contacts list, such that a hardware technician assigned to the customer's application may be designated as the recipient of the hardware install message. Additionally, other parties may be informed of the issuance of the hardware install message, such as the customer, or a technician availability manager.

Once the hardware technician receives 1182 the hardware install message, the hardware technician conducts the requested hardware change 1184, in this case the addition of the RAM. The hardware technician may then generate 1186 a message indicating the successful installation of the RAM. This message is transmitted 1188 to the message handler. Once the message handler receives 1190 the message, the message handler again applies 1192 rules to the contents of the message, and generates necessary messages as indicated by the contents of the successful installation message. In addition to forwarding 1194 the message to a service ticket tracking tool, the message handler notifies 1196 the configuration mapping tool of the change in the application configuration, may generate 1197 a message to the customer indicating the successful installation, and generates 1198 a message to a billing tool noting the need to charge for the purchase, installation, and utilization of the additional RAM. Once these messages have been generated and transmitted, the message handler may return 1199 to monitoring the general flow of messages to identify indicated actions.

Execution of the individual steps associated with performing the RAM installation may be coordinated through the service ticket tool, or may be coordinated by the message handler itself. As each step required to perform the addition of the requested RAM occurs, the tool responsible for the step may receive its instructions via a message, and report the completion of its task via a response message.

The ability to use off-the-shelf software packages to carry out the functionality of the different tools may be enabled by the ability of a message to initiate the process at the receiving application. A message may contain a set of data and an instruction to the recipient of the message to execute some task based on the data, with the response to the message being the results of the recipient having executed its task based on the passed data. This methodology is analogous to the passing of a function call. In basic programming, defined functions have to be written and linked to the calling program, limiting the ability to integrate disparate tools created by different vendors. Each time a vendor revises or upgrades its tools, the links between the calling program and the tool would have to be re-established, with resultant inefficiencies from the efforts required to ensure compatibility between calling and receiving tools.

By encoding messages using a standardized format, such as, but not limited to, XML, XML-RPC, and SOAP, standardized interface definitions may be provided to the individual tools, such that the tools can identify required formats by reference to the published definitions. Accordingly, an application mapping tool could receive a request identifying a desired map of components associated with a hosted application. The identification could be based on data contained in a requesting message. By referring to the published schema identifying the characteristics of the data in the message, the mapping tool would be able to parse the message to understand the provided information. With the information understood, the mapping tool could determine a response to the request by identifying the relevant application configuration. Once the information for the response has been determined, recalled from a database, or obtained in any other manner, the mapping tool could transmit a message back to the requesting tool providing the requested information. Again, since the sending tool has access to the format definitions, the response message is able to use a standardized format understandable by the requesting tool.

Rather than having to tailor interfaces to each tool, and integrate each and every tool which may communicate with another tool, the standard provided by the common message format allows the addition or deletion of tools without having to re-engineer the entire message protocol. New schema may have to be developed and published to enable the functionality of a new tool, but the ability of tools to reference the published definitions limits the re-engineerinig task, as the tools may be capable of determining message formats without recourse to operator programming or intervention.

In addition to being able to handle messages associated with service ticket tracking or hardware addition tasks, the message handler of the present invention may be utilized in conjunction with a software build script generator, such as that disclosed in U.S. patent application Ser. No. 09/783,745, filed on Feb. 15, 2001, and herein incorporated in its entirety by reference thereto. The incorporation of such a tool into the back end systems allows a software reconfiguration, addition, or deletion, to be accomplished in a fully automated fashion between tools by utilizing rules associated with the message handler to schedule and control software changes on an application component.

Automated software provisioning may be accomplished by submitting a message to a build script generating tool, such that a script installing a requested software package could be generated in response to the message, and injected into a start-up routine on the component for which the software change is desired. This automated provisioning therefore may be based on the transmittal of a message to the build script generating tool identifying the recipient component, the software to be installed, and could also include a schedule for installing the software, such that down-time on the component can be coordinated into an off-peak hour. The scheduling identification may be made in accordance with a customer-defined rule, based on the utilization of the customer's application.

Although the above discussion is generally in terms of fully automated operation of back end-systems of an application hosting service, the tools can be enabled manually by systems operators to allow automated functionality to be implemented gradually. For example, the configuration management tool function may be enabled by a human acting as the configuration manager. A requested configuration change request could be transmitted to the operator. In such a scenario, it would likely be beneficial for the message handler to have issued an application configuration map request prior to sending the operator the change request, such that the configuration map could accompany the change request. Change requests could be assigned priorities based on a service subscription level, such that service-based rules would affect the scheduling of the configuration change review. Each of the functions could be so enabled, as long as the message handler were provided with sufficient rules to enable the processes underlying the rules.

Although the message handler is identified as a separate tool in the above description, the message handler is a function that may be incorporated into another tool, such as a service ticket tracking tool. The suitability of integrating the message handler with another tool is dependant on the extent to which rules are to be applied to messages. If the application is to be limited to notification instructions being sent to a customer, integration of the message handler with the portal minimizes any inefficiency associated with having every back-end message reviewed by a message handler.

Alternately, the message handler function may be distributed between applications, such that each tool is responsible for reviewing messages sent to that tool. In a distributed system, individual tools may rely on a centralized customer-based rules knowledge base, such that the tools may access the rules to determine message handling.

Alternately, in a distributed handling instruction, diverse tools may request action instructions from a centralized customer-based rules tool which determines actions based on the content of a query message. In such an implementation, the diverse tools would format an action query to a customer-based rules determination tool. The contents of the message would include both the contents of the original message, as well as an identification of a customer associated with the contents of the message.

The present invention may be embodied in other specific forms than the embodiments described above without departing from the spirit or essential attributes of the invention. Accordingly, reference should be made to the appended claims, rather than the foregoing specification, as indicating the scope of the invention.

What is claimed is:

1. A computing device-implemented method comprising:
   receiving, by the computing device and from a client, a message that includes message header information identifying a plurality of fields included in a body of the received message;
   accessing, by the computing device and based on the message header information, field definitions for the plurality of fields;
   identifying, by the computing device, rules associated with the field definitions; and
   applying, by the computing device and based on contents of the plurality of fields, the identified rules, where applying the identified rules includes:
      selecting, based on the identified rules and the contents of the plurality of fields, a first message form of a plurality of message forms, where the first message form is associated with a first recipient device and includes a plurality of first data fields,
      identifying, based on the contents of the plurality of fields, additional information available through another computing device that differs from the computing device,
      acquiring, via the other computing device, the additional information,
      populating, based the contents of the plurality of fields and the additional information, the first data fields in the first message form,
      sending the first message form, with the populated first data fields, to the first recipient device,
      receiving, from the first recipient device, a reply message that includes reply data,
      selecting, based on the identified rules and the reply data, a second message form of the plurality of message forms, where the second message form is associated with a second recipient device and includes a plurality of second data fields,
      populating the second data fields in the second message form based the contents of the plurality of fields and the reply data,
      formatting, based on the identified rules, the second message form with the populated second data fields, and
      sending, to the second recipient device, the formatted second message form,
   where the received message relates to a fault associated with the client, and
   where applying the identified rules further includes:
      initiating corrective actions corresponding to the fault.

2. The computing device-implemented method of claim 1, where at least one rule of the identified rules includes information identifying a party, and
   where applying the identified rules further includes:
      generating a notification, and
      transmitting the notification to the party.

3. The computing device-implemented method of claim 1, where the received message is associated with a schema that identifies the received message as directed to one or more of:
   performance monitoring,
   asset management,
   case management,
   billing, or
   operations policy,
   where the schema provides the field definitions for the plurality of fields in the body of the received message.

4. The computing device-implemented method of claim 1, where the received message is in an Extensible Markup Language (XML) format.

5. The computing device-implemented method of claim 1, where applying the identified rules further includes:
   determining, based on the rules and the contents of the plurality of fields, to send a notification related to the received message;
   accessing a contacts list to identify a party to which to direct the notification;
   generating the notification; and
   sending the notification to the identified party.

6. The computing device-implemented method of claim 1, where at least one rule of the identified rules includes information identifying a job title of a party to receive a first message, and
   where applying the identified rules further includes:
      accessing a contacts list to identify contact information for an individual associated with the job title,
      generating the first message, and
      transmitting the first message to the individual using the identified contact information.

7. The computing device-implemented method of claim 1, where applying the identified rules further includes:
   generating at least one command to a device to initiate one or more actions related to the received message, and sending the at least one command to the device, the at least one command causing the device to initiate the one or more actions.

8. The computing device-implemented method of claim 1, where the additional information includes at least one client rule, associated with the client that sent the message and available through the other computing device.

9. The computing device-implemented method of claim 8, where the additional information further includes a status of a device associated with a customer and a plurality of contact addresses, and
where applying the identified rules further includes:
  selecting, based on the status of the device and the at least one customer rule, one of the plurality of contact addresses as the second recipient device.

10. A computing device comprising
a memory to store instructions; and
a processor to implement the instructions to:
  receive a message, from a client, that includes message header information, the message header information identifying a field that is included in a body of the received message,
  retrieve, based on the message header information, a field definition for the identified field,
  identify at least one rule associated with the retrieved field definition, and
  cause an action to be performed by applying the identified at least one rule to contents of the identified field,
  where the processor, when causing the action to be performed, is further to:
    select, based on the identified at least one rule and the contents of the field, a first message form of a plurality of message forms, where the first message form is associated with a first recipient device and includes a plurality of first data fields,
    identify, based on the contents of the field, additional information available through another computing device that differs from the computing device,
    acquire, via the other computing device, the additional information,
    populate, based the contents of the field and the additional information, the plurality of first data fields in the first message form,
    send the first message form, with the populated first data fields, to the first recipient device,
    receive, from the first recipient device, a reply message that includes reply data,
    select, based on the identified at least one rule and the reply data, a second message form of the plurality of message forms, where the second message form is associated with a second recipient device and includes a plurality of second data fields,
    populate the second data fields in the second message based the contents of the field and the reply data,
    format, based on the identified at least one rule, the second message with the populated second data fields, and
    send, to the second recipient device, the formatted second message,
  where the received message relates to a fault, and
  where, when causing the action to be performed, the processor is further to:
    initiate corrective actions corresponding to the fault.

11. The computing device of claim 10, where the at least one rule includes information identifying a party, and
where, when causing the action to be performed, the processor is further to:
  generate a notification related to the received message, and
  transmit the notification to the party.

12. The computing device of claim 10, where the received message is associated with a schema that identifies the message as directed to at least one of:
  performance monitoring,
  asset management,
  case management,
  billing, or
  operations policy,
  where the schema provides the field definition for the field.

13. The computing device of claim 10, where the received message is in an Extensible Markup Language (XML) format.

14. The computing device of claim 10, where, when causing the action to be performed, the processor is further to:
  access a contacts list to identify a party to receive a notification,
  generate the notification, and
  send the notification to the identified party.

15. The computing device of claim 10, where, when causing the action to be performed, the processor is further to:
  generate at least one command to a device to initiate one or more actions related to the received message, and
  send the at least one command to the device, the at least one command causing the device to initiate the one or more actions.

16. The computing device of claim 10, where the additional information includes at least one client rule, associated with the client that sent the message and available through the other computing device.

17. The computing device of claim 9, where the additional information further includes a status of a device associated with a customer and plurality of contact addresses, and
where the processor, when applying the identified at least one rule, is further to:
  select, based on the status of the device and the at least one rule, one of the plurality of contact addresses as the second recipient device.

18. A non-transitory computer-readable medium to store instructions comprising:
  one or more instructions, which when executed by a device, cause the device to receive a message, from a client, that includes message header information, the message header information identifying a field that is included in a body of the received message;
  one or more instructions, which when executed by the device, cause the device to retrieve, based on the message header information, a field definition for the identified field;
  one or more instructions, which when executed by the device, cause the device to identify at least one rule associated with the retrieved field definition; and
  one or more instructions, which when executed by the device, cause the device to cause an action to be performed by applying the identified at least one rule to contents of the identified field,
  where the one or more instructions to cause the action to be performed further include:
    one or more instructions to select, based on the identified at least one rule and the contents of the identified field, a first message form of a plurality of message forms, where the first message form is associated with a first recipient device and includes a plurality of first data fields, one or more instructions to identify, based on the contents of the field, additional information available through another computing device that differs from the computing device, one or more instructions to acquire, via the other computing device, the additional information, one or more instructions to populate, based the contents of the field and the additional information, the first data fields in the first message form, one or more instructions to send the first message form, with the populated first data fields, to the first recipient device, one or more instructions to receive, from the first recipient device, a reply message that includes reply data, one or more instructions to select, based on the identified at least one rule and the reply data, a second message form of the plurality of message forms, where the second message form is associated with a second recipient device and includes a plurality of second data fields, one or more instructions to populate the second data fields in the second message based the contents of the field and the reply data, one or more instructions to format, based on the identified at least one rule, the second message, with the populated second data fields, and one or more instructions to send, to the second recipient device, the formatted second message, where the received message relates to a fault, and where the one or more instructions to cause the action to be performed include:
one or more instructions to initiate corrective actions corresponding to the fault.

19. The non-transitory computer-readable medium of claim 18, where the one or more instructions to acquire the additional information include:
one or more instructions to acquire at least one client rule, where the at least one client rule is associated with the client that sent the message and is located at the other computing device.

20. The non-transitory computer-readable medium of claim 19, where the one or more instructions to acquire the additional information include:
one or more instructions to acquire information about a status of a device associated with a customer and a plurality of contact addresses; and
one or more instructions to select, based on the status of the device and the at least one client rule, one of the plurality of contact addresses as the second recipient device.

* * * * *